United States Patent
Wang et al.

(10) Patent No.: US 12,218,558 B2
(45) Date of Patent: Feb. 4, 2025

(54) MOTOR ASSEMBLY FOR LINEAR DIRECT-DRIVE MOTOR

(71) Applicants: Mitsubishi Electric Research Laboratories, Inc., Cambridge, MA (US); Mitsubishi Electric Corporation, Tokyo (JP)

(72) Inventors: Bingnan Wang, Cambridge, MA (US); Hongyu Wang, Cambridge, MA (US); Yusuke Sakamoto, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 335 days.

(21) Appl. No.: 17/653,993

(22) Filed: Mar. 8, 2022

(65) Prior Publication Data

US 2023/0291294 A1    Sep. 14, 2023

(51) Int. Cl.
*H02K 41/03* (2006.01)
*B65G 23/23* (2006.01)
(Continued)

(52) U.S. Cl.
CPC ......... *H02K 41/033* (2013.01); *H02K 41/031* (2013.01); *B65G 23/23* (2013.01);
(Continued)

(58) Field of Classification Search
CPC ........ H02K 41/00; H02K 41/02; H02K 41/03; H02K 41/031; H02K 1/34; B65G 23/23;
(Continued)

(56) References Cited

U.S. PATENT DOCUMENTS

| | | | | |
|---|---|---|---|---|
| 6,075,297 A | * | 6/2000 | Izawa | H02K 41/03 310/12.24 |
| 7,224,089 B2 | | 5/2007 | Sa | |

(Continued)

FOREIGN PATENT DOCUMENTS

| | | | |
|---|---|---|---|
| CN | 110034655 A | * | 7/2019 |
| EP | 1300932 | | 12/2013 |

(Continued)

OTHER PUBLICATIONS

Zhang, machine translation of cn110034655, Jul. 2019 (Year: 2019).*

(Continued)

*Primary Examiner* — Eric Johnson
(74) *Attorney, Agent, or Firm* — Gene Vinokur

(57) ABSTRACT

A motor assembly comprising a mover assembly and a stator. The mover assembly comprising a plurality of mover assembly units, each unit comprising: a non-ferromagnetic core with a profile of an outer surface having at least two flat sections lying on intersecting planes; at least two ferromagnetic laminated structures arranged on the at least two flat sections of the non-ferromagnetic core, each ferromagnetic laminated structure includes a stack of ferromagnetic plates, each plate is covered with a non-conductive coating. Each ferromagnetic laminated structure is arranged on a corresponding flat section of the at least two flat sections of the non-ferromagnetic core such that side of each ferromagnetic plate is adjacent to the non-ferromagnetic core thereby making the ferromagnetic plates of the at least two ferromagnetic laminated structures lie on intersecting planes. The mover assembly unit further comprises windings of wire wrapped around the ferromagnetic laminated structures and the non-ferromagnetic core.

11 Claims, 19 Drawing Sheets

(51) Int. Cl.
*B65G 54/02* (2006.01)
*H02K 1/2783* (2022.01)
*H02P 25/064* (2016.01)

(52) U.S. Cl.
CPC ........ *B65G 54/02* (2013.01); *B65G 2811/095* (2013.01); *H02K 1/2783* (2022.01); *H02P 25/064* (2016.02)

(58) Field of Classification Search
CPC .. B65G 54/02; B65G 2811/095; H02P 25/064
See application file for complete search history.

(56) References Cited

U.S. PATENT DOCUMENTS

| | | |
|---|---|---|
| 10,012,873 B2 | 7/2018 | Chu et al. |
| 2003/0102723 A1* | 6/2003 | Korenaga ........... G03F 7/70758 310/12.24 |
| 2005/0006959 A1* | 1/2005 | Hoppe .................. H02K 41/03 310/12.16 |
| 2006/0028070 A1 | 2/2006 | Sahin |
| 2008/0048505 A1* | 2/2008 | Moriyama ............. H02K 41/03 310/12.25 |
| 2014/0285048 A1 | 9/2014 | Seo et al. |
| 2019/0300329 A1* | 10/2019 | Korhonen ........... B66B 11/0407 |

FOREIGN PATENT DOCUMENTS

| | | | |
|---|---|---|---|
| JP | 2002359962 A | * | 12/2002 |
| JP | 6402739 | | 10/2018 |
| WO | 2013022351 | | 2/2013 |

OTHER PUBLICATIONS

To, machine translation of jp2002359962, Dec. 2002 (Year: 2002).*
Xing, Feng, Baoquan Kou, Lu Zhang, Tiecheng Wang, and Chaoning Zhang. 2018. "Analysis and Design of a Maglev Permanent Magnet Synchronous Linear Motor to Reduce Additional Torque in dq Current Control" Energies 11, No. 3: 556.
W. Zhao, J. Zheng, J. Wang, G. Liu, J. Zhao and Z. Fang, "Design and Analysis of a Linear Permanent-Magnet Vernier Machine With Improved Force Density," in IEEE Transactions on Industrial Electronics, vol. 63, No. 4, pp. 2072-2082, Apr. 2016, doi: 10.1109/TIE.2015.2499165.

* cited by examiner

MOTOR ASSEMBLY FOR LINEAR DIRECT-DRIVE MOTOR

TECHNICAL FIELD

This invention relates generally to a direct-drive motor, and more specifically to a motor assembly of the direct-drive motor.

BACKGROUND

Conventional electric motors convert electric energy into mechanical energy. The conventional electric motors operate through interaction between the motor's magnetic field and electric current in a winding to generate a force in the form of rotation of a shaft. Most of the conventional electric motors require pairing with speed-reducing transmission mechanism (such as a gearbox) when driving the loads for various applications. The pairing is mainly due to two reasons: (a) typically electric machines are most efficient at its rated speed, which is usually a lot higher than the needed speed of the load; and (b) the direct torque output of the electric machines is usually not large enough for the application, and a transmission mechanism is needed to increase torque. Such motor drive architecture including both the electric motor and the transmission mechanism are utilized in various application areas, such as machine tools, industrial machinery, home appliances, electric vehicles, and the like.

However, the gearbox typically has nonlinear dynamics such as backlash hysteresis, nonlinear Coulomb friction, which can impair the electric motor's dynamic performance, and is not favorable for precision applications. To that end, in several application areas, such as machine-room-less elevators, robot manipulators, precision rotary stages, and in-wheel drives for electric vehicles, it may be beneficial to eliminate the transmission mechanism, and directly drive the load with the electric motor. Motors that directly drive the loads are called direct-drive motors.

A majority of electric motors are rotary machines, with a rotor that rotates along an axis. For some applications, for example, linear precision stages, linear motion is required. Therefore, transmission devices such as belts are needed with rotary motors. The traditional "servo motor" and "transmission device" systems are typically used for serv-feed purpose that are essential to many industrial applications such as CNC machine tools. With the existence of transmission mechanism, friction and complicated structures are inherent defects in such systems. Therefore, for such systems, direct-drive system with linear motors is highly desirable.

For a linear direct-drive motor, the basic structure includes one stator and one mover/forcer, with an air gap in between. An exemplar stator of the direct-drive motor includes permanent magnets and back iron and forms a linear rail. An exemplar mover/forcer can include coils with or without iron core, moves along the stator rail (also referred to as "stator track"), and is generally shorter in length compared with the stator track. However, such an arrangement in the conventional linear direct-drive motor provides limited, e.g., only one interface between the stator and the mover that generates the thrust force. Thus, a significant amount of current-carrying winding that generates useful thrust force is left unused.

Therefore, there is a need for a liner direct-drive motor with a better design structure that eliminates the shortcomings of the conventional linear direct-drive motor discussed above.

SUMMARY

It is an object of some embodiments to provide a motor configuration (or assembly) based on a linear direct-drive motor configuration, which provides multiple interfaces between the stator and the mover to generate higher density thrust force.

It is an object of some embodiments of the present disclosure to provide a motor configuration (or assembly) comprising a mover and a stator that delivers high force density, aiming at direct-drive actuators in various application areas. It is also an objective of some embodiments of the present disclosure to provide a motor assembly that increases the force density by reducing eddy current loss. Additionally or alternatively it is an objective of some embodiments of the present disclosure to provide a motor assembly that provides flexibility in adjusting dimensions of each force-generating surface of the motor configuration such as intersecting surfaces of the mover and the stator.

Some embodiments are based on a recognition that the force density of the linear direct-drive motor can be increased by increasing an interface formed by the force-generating surfaces (also referred to as "active planes") of the motor configuration. The force-generation surface is formed by a surface of a mover having windings of wires adjacent to a surface of a stator having magnets. To increase the interface without unpractically increasing the dimensions of the motor assembly, there is a need for a more complex profile of the force-generation surface that includes force-generation surfaces lying on intersecting planes. Examples of such profiles include L-shaped profile, rectangular profile, triangular profile, and the like. However, the force-generation surfaces lying on intersecting planes create an additional problem reducing the efficiency of the motor.

Some embodiments are based on the recognition that when the motor assembly comprising a mover, with at least two ferromagnetic structures arranged on at least two intersecting surfaces of the mover, the motor assembly produces at least two currents, where each current is generated due to interface between each surface of the mover with corresponding surface of the stator. The magnetic field generated by these currents are in different directions. Therefore, eddy current are generated in the at least two ferromagnetic structures of the motor assembly in different directions which creates significant losses.

To reduce the losses due to the eddy current in the motor assembly, laminations are used to laminated the at least two ferromagnetic structures. Specific lamination directions are chosen according to the magnetic field pattern, where the magnetic field pattern (also referred to as "magnetic field") in turn is produced by current flowing through windings of the mover (also referred to as "the winding current"). For linear motors with one active plane for thrust force generation, a major magnetic field pattern is one direction, and it is straightforward to address the problem and choose the same lamination direction for a ferromagnetic structure. However, for linear motors with multiple active plane that are in different directions, magnetic fields are generated in different directions in the ferromagnetic structures. Using laminations of the same direction cannot reduce the eddy current losses for all directions. The motor assembly reduces eddy current losses in all direction by using multiple laminated structures that are in different directions according to the magnetic field direction.

To that end, the present disclosure proposes a linear motor assembly with at least two-force generating interfaces between a stator track (or rail), where the stator track comprises an array of permanent magnets such as Vernier permanent magnet or Halbach permanent magnet, and where the mover comprises a slotted iron core (also referred to as ferromagnetic laminated structure) to hold windings and guide magnetic flux, and a non-ferromagnetic core in the center to support the iron cores and the windings. The iron cores are laminated, for example iron cores are laminated steel sheets to minimize eddy current loss. Some exemplary shapes of the linear motor assembly with at least two intersecting and force generating interfaces comprises U-shaped stator rail and mover, a triangle shaped stator and mover, a diamond shaped stator and mover, a trapezium shaped stator and mover, and the like.

Accordingly, one embodiment discloses a motor assembly including a mover assembly configured to slide during an operation of the motor assembly along magnets forming inner walls of a stator, the mover assembly comprising: a plurality of mover assembly unit, where each mover assembly unit comprises: a non-ferromagnetic core with a profile of an outer surface having at least two flat sections lying on intersecting planes. The mover assembly unit further comprises at least two ferromagnetic laminated structures arranged on the at least two flat sections of the non-ferromagnetic core, each of the at least two ferromagnetic laminated structures includes a stack of ferromagnetic plates. Each ferromagnetic plate in the stack is covered with a non-conductive coating, and each of the at least two ferromagnetic laminated structures is arranged on a corresponding flat section of the at least two flat sections of the non-ferromagnetic core such that side of each ferromagnetic plate is adjacent to the non-ferromagnetic core thereby making the ferromagnetic plates of the at least two ferromagnetic laminated structures lie on intersecting planes perpendicular to the intersecting planes of the at least two flat sections of the non-ferromagnetic core. The mover assembly unit further comprises windings of wire wrapped around the at least two ferromagnetic laminated structures and the non-ferromagnetic core.

In some embodiments, a shape of the mover assembly corresponds to a polyhedron.

In some embodiments, each mover assembly unit comprises the non-ferromagnetic core with a U-shaped profile of the outer surface with three flat sections, and a first ferromagnetic laminated structure and a second ferromagnetic laminated structure are arranged on a first flat section and a second flat section of the non-ferromagnetic core, respectively. The first flat section and the second flat section are parallel to each other and perpendicular to the third flat section of the non-ferromagnetic core, and a third ferromagnetic laminated structure is arranged in a gap opposite to the third flat section of the non-ferromagnetic core. A third ferromagnetic laminated structure is arranged in a gap opposite to the third flat section of the non-ferromagnetic core. The third ferromagnetic laminated structure is arranged using another non-ferromagnetic core that comprises a first projection and a second projection that slide into a corresponding first groove and a second groove of the non-ferromagnetic core such that the third ferromagnetic laminated structure is isolated from the first ferromagnetic laminated structure and the second ferromagnetic laminated structure lying on planes intersecting a plane on which the third ferromagnetic laminated structure lies.

In some embodiments, each flat section, of the at least two flat sections, comprises a groove to accommodate a ferromagnetic laminated structure, where the ferromagnetic laminated structure slides into the groove on each flat section of the at least two flat sections.

Some embodiments are based on the realization that a modular mover allows flexibility in adjusting length of the mover. Therefore, the mover assembly is formed by a plurality of mover assembly units, where the plurality of the mover assembly units is stacked together to form the mover assembly using guide teeth and grooves on the ferromagnetic laminated structures of each mover assembly unit of the plurality of the mover assembly units.

In some embodiments, the stator comprises at least two inner walls, each wall comprising an array of magnets, and where the mover is arranged in the stator such that the at least two ferromagnetic laminated structures and the winding around the at least two ferromagnetic laminated structures are in contact with the at least two inner walls of the stator. Further, the magnet in the array of magnet in the stator comprises at least one of: a Halbach permanent magnet or Vernier permanent magnet.

Accordingly, one embodiment discloses a system including a motor comprising the motor assembly, further comprising: a digital controller configured to generate control signals specifying values of one or combination of multi-phase voltages and multi-phase currents of the motor for tracking a reference trajectory of torques of the motor, and an inverter configured to supply the multi-phase voltages and currents generated according to the control signals to multi-phase windings of the motor to reduce an error between the reference trajectory and measured torque of the motor.

Accordingly, another embodiment discloses motor assembly including a mover assembly configured to slide during an operation of the motor assembly along outer walls of the stator. The mover assembly comprises magnets on inner walls of the mover assembly. The stator comprises a non-ferromagnetic core with a profile of an outer surface having at least two flat sections lying on intersecting planes; at least two ferromagnetic laminated structures arranged on the at least two flat sections of the non-ferromagnetic core, each of the at least two ferromagnetic laminated structures includes a stack of ferromagnetic plates. Each ferromagnetic plate in the stack is covered with a non-conductive coating, where each of the at least two ferromagnetic laminated structures is arranged on a corresponding flat section of the at least two flat sections of the non-ferromagnetic core such that side of each ferromagnetic plate is adjacent to the non-ferromagnetic core thereby making the ferromagnetic plates of the at least two ferromagnetic laminated structures lie on intersecting planes perpendicular to the intersecting planes of the at least two flat sections of the non-ferromagnetic core. The stator further comprises windings of wire wrapped around the at least two ferromagnetic laminated structures and the non-ferromagnetic core.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
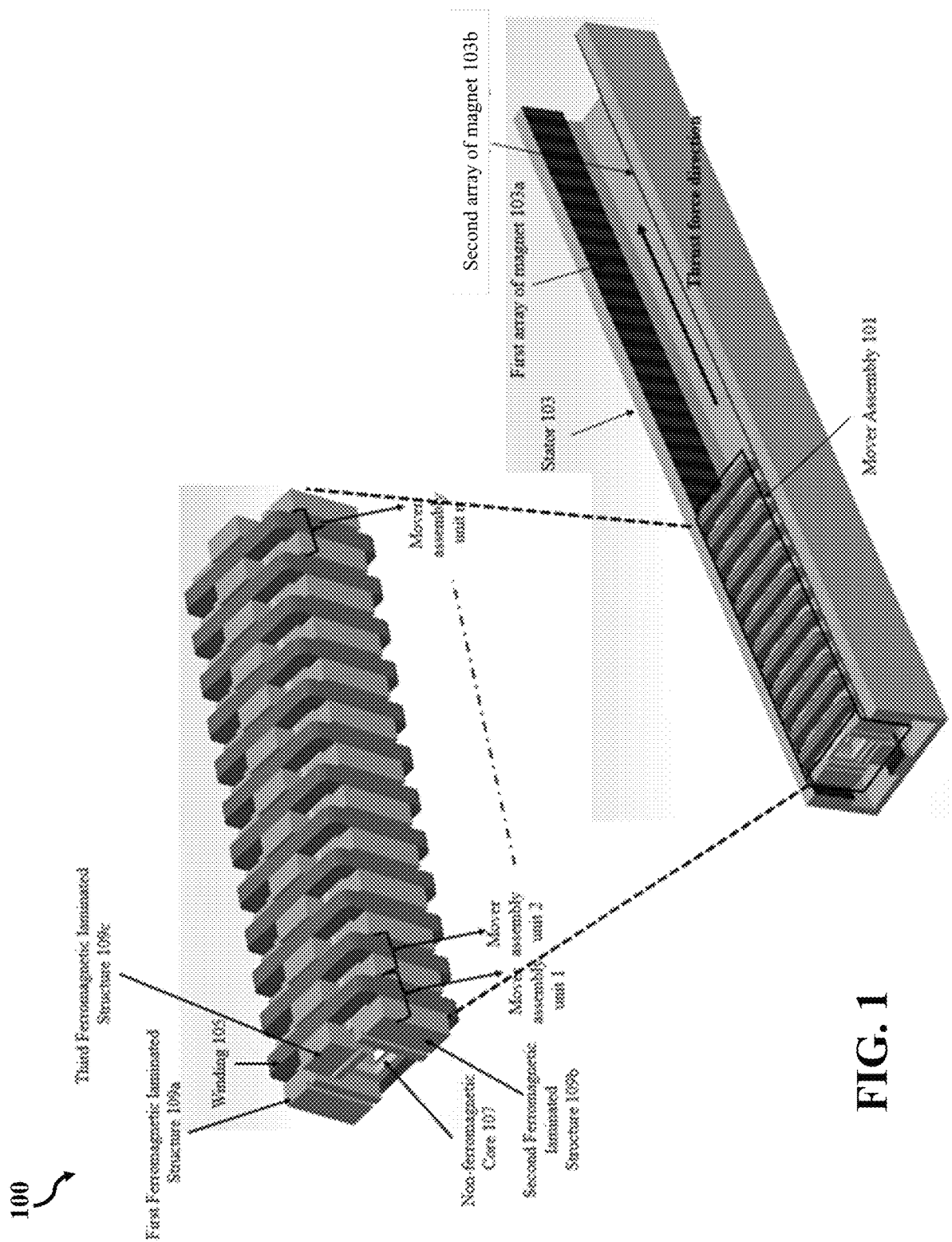
FIG. 1 illustrates a top perspective view of a motor assembly, in accordance with an example embodiment.

FIG. 1 illustrates a top perspective view of a motor assembly 100, in accordance with an example embodiment. The motor assembly 100 comprises a mover assembly 101 and a stator 103. The mover assembly 101 is smaller in size compared to the stator 103, where the mover assembly 101 is configured to slide during an operation of the motor assembly 100 along inner walls of the stator 103. The inner walls of the stator 103 forms a track (also referred to as "rail") for the mover assembly 101, where the track comprises at least two arrays of magnet—a first array of magnets 103a and a second array of magnet 103b along the inner walls of the stator 103. Further, a magnified view of the mover assembly is reproduced in FIG. 1. The mover assembly 101 in the magnified view is shown inverted for ease of description.

The mover assembly 101 (in the magnified view) is made up of a plurality of mover assembly units (mover assembly unit 1, mover assembly unit 2, . . . , mover assembly unit n), where each mover assembly unit (for example, mover assembly unit 1) comprises a non-ferromagnetic core 107 on which at least two ferromagnetic laminated structures, for example, a first ferromagnetic laminated structure 109a, a second ferromagnetic laminated structure 109b, and a third ferromagnetic laminated structure 109c are arranged. Further, each mover assembly unit comprises winding 105 of wire wound around the non-ferromagnetic core 107 and the at least two ferromagnetic laminated structures (for example, 109a, 109b, and 109c), where the wire is made from any electrically conductive material such as copper.

The motor assembly 100 is configured such that when the mover assembly 101 moves along the stator 103, at least two sides of each mover assembly unit (mover assembly units 1-mover assembly units n) of the mover assembly 101 interacts with the at least two arrays of magnet 103a and 103b of the stator 103. The interaction between the mover assembly 101 and the arrays of magnet 103a and 103b of the stator 103 generates a thrust force in a direction shown in the FIG. 1, where the thrust force is used to drive a load for example, a linear direct drive motor.

Figure 2:
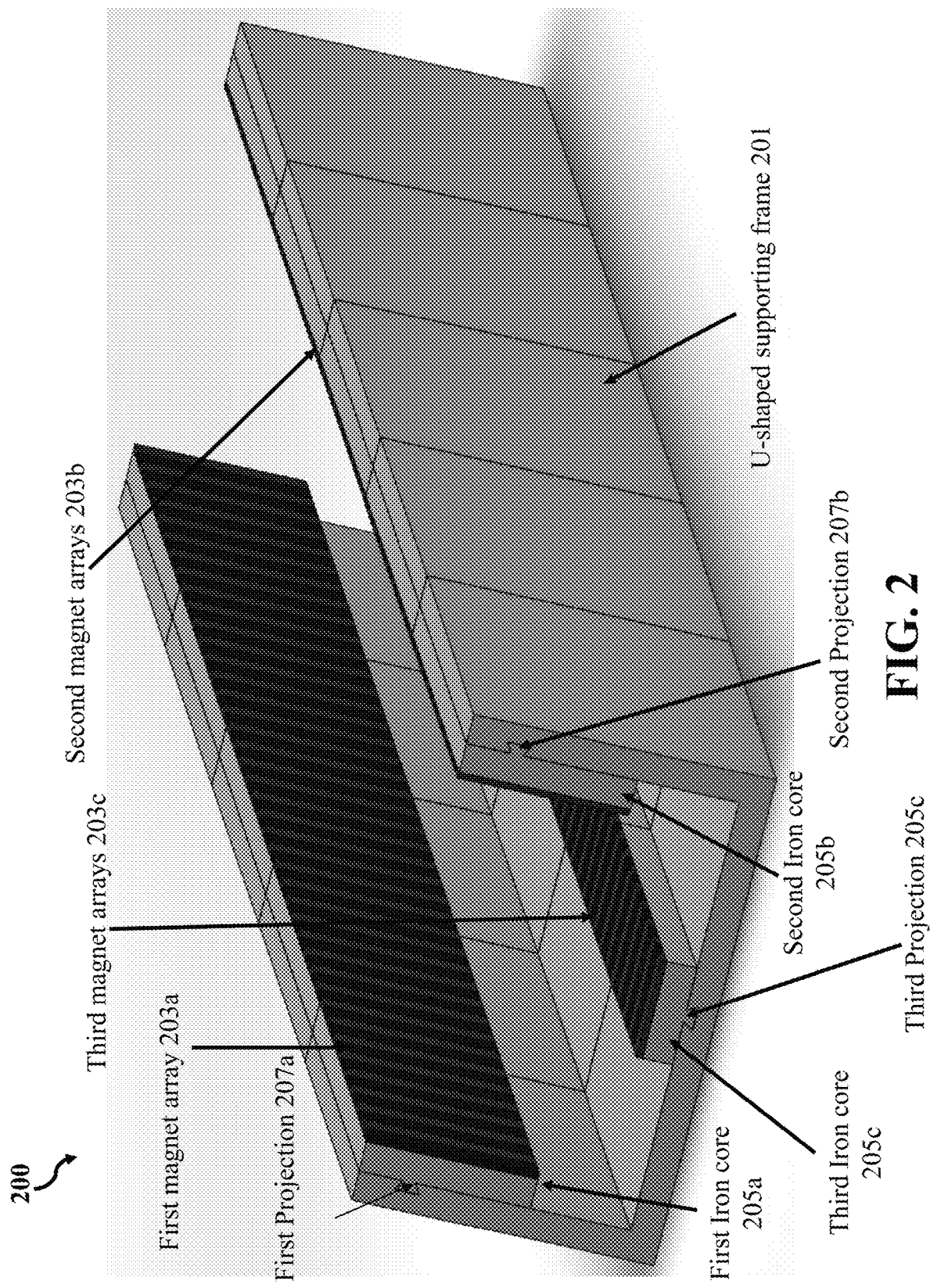
FIG. 2 illustrates a U-shaped stator, in accordance with an example embodiment.

FIG. 2 illustrates a U-shaped stator 200, in accordance with an example embodiment. The U-Shaped stator 200 corresponds to the stator 103 (FIG. 1). The U-shaped stator 200 comprises a U-shaped supporting frame 201. On three inner walls of the U-shaped supporting frame 201, three iron cores i.e., a first iron core 205a, a second iron core 205b, and a third iron core 205c are installed. Each iron core (205a-205c) comprises a projection i.e., a first projection 207a, a second projection 207b, and a third projection 207c respectively, where to install each iron core 205a-205c, the respective projections 207a-207c are slid through corresponding grooves on the U-shaped supporting frame 201.

Further, each iron core 205a-205c comprises an array of permanent magnets (also referred to as "magnet arrays"), for example, a first magnet array 203a on the first iron core 205a, a second magnet array 203b on the second iron core 205b, and a third magnet array 203c on the third iron core 205c.

In some embodiments, the thrust force density generated by the motor assembly 100 shown in FIG. 1 is improved by using a Vernier permanent magnet. To this end, the Vernier permanent magnet produces a higher torque density at low-speed range by using a magnetic gearing effect. A Vernier permanent magnet motor can be realized when the phase winding pole pair number p, the permanent magnet array pole pair number $Z_{pm}$, and slot/teeth number $Z_s$ satisfies the following relation $Z_{pm}=Z_s\pm p$.

Considering only fundamental harmonic term, the magnetomotive force (MMF) generated by the permanent magnet array is expressed as:

$$\mathcal{F}_{pm}(x) = \mathcal{F}_{pm_1} \cos\left(Z_{pm}\frac{2\pi}{L}x\right) \quad (1)$$

Where x is the position along the air gap in the moving direction, L is the active length of the mover, $F_{pm1}$ is the amplitude given by the remanent flux of the magnet $B_r$, the magnet height $h_m$, and the free-space permeability $\mu_0$.

$$\mathcal{F}_{pm_1} = \frac{4}{\pi}\frac{B_r h_m}{\mu_0} \quad (2)$$

The air gap permeance $P_g(x, t)$ considering the fundamental harmonic term of the slotting effect due to the teeth in the mover, is expressed as $$P_g(x, t) \approx P_0 + P_1 \cos\left[Z_s\frac{2\pi}{L}(x - x_t)\right] \quad (3)$$

Where $P_0$ is the DC component of the permeance, $P_1$ is the amplitude for the first harmonic term, Z is the slot number in the mover, $x_t$ is the position of the mover at time t.

Then the air gap magnetic flux density generated by the permanent magnet array is calculated as:

$$B_{pm}(x, t) = \mathcal{F}_{pm}(x)P_g(x, t) \quad (4)$$

$$\approx \mathcal{F}_{pm_1}\cos(Z_{pm}\frac{2\pi}{L}x)(P_0 + P_1\cos\left[Z_s\frac{2\pi}{L}(x - x_t)\right])$$

$$= B_{pm0}\cos(\frac{2\pi}{L}Z_{pm}x) + B_{pm1}\cos(\frac{2\pi}{L}(Z_{pm} \pm Z_s)x - Z_s x_t)$$

With $B_{pm_0} = \mathcal{F}_{pm_1}P_0$, $B_{pm_1} = \frac{\mathcal{F}_{pm_1}P_1}{2}$.

The first term of the air gap flux density has harmonic order $Z_{pm}$, and the second term has harmonic order $Z_{pm}\pm Z_s$.

To generate thrust force, the air gap flux needs to interate with the MMF generated by the winding currents of the same harmonic order. The fundamental order of the MMF due to winding current is p, which is the pole pair number of the windings. Considering slotting effect, the MMF will include harmonic orders $Z_s\pm p$.

Therefore, when the condition $Z_{pm}=Z_s\pm p$ holds, both terms in the air gap flux density match with the winding MMF, and can be used to generate thrust force. The first term utilizes the slotting harmonic such that $Z_{pm}=Z_s+p$ or $Z_{pm}=Z_s-p$, and the second term utilizes the fundamental harmonic order which is $(Z_{pm}-Z_s)=\pm p$.

In this case, both a fundamental harmonic air gap flux and a teeth harmonic air gap flux participate in the thrust force generation, effectively increasing the thrust force density.

In another embodiment, the motor assembly 100 may utilize a Halbach array of magnets. The Halbach array is an arrangement of the permanent magnets that augments magnetic field on one side of the array while canceling the magnetic field to near zero on the other side.

Some embodiments are based on a realization that the magnetic field augmentation is achieved by arranging horizontally magnetized magnets in between alternating polarity. The Halbach array reduces magnitude of high-order magnetic field harmonics. Thus, the Halbach array aids in smooth operation of the motor. In addition, the Halbach array does not require a thick secondary back iron as the permanent magnet arrays, thus saving the material cost.

Figure 3:
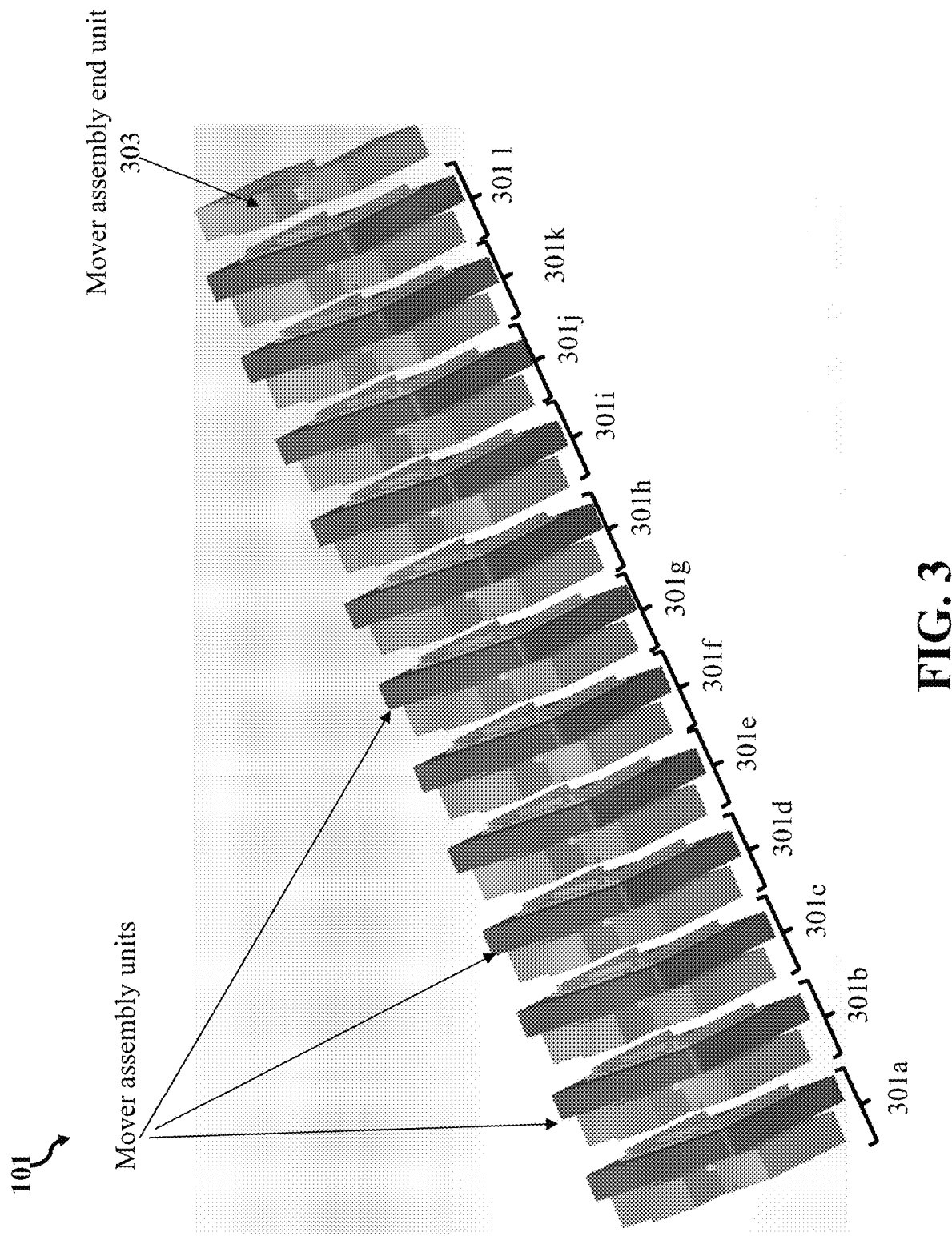
FIG. 3 illustrates an exploded view of a mover assembly, in accordance with an example embodiment.

Further, more details regarding the mover assembly 101 is described below with reference to FIG. 3 to FIG. 14 below.
Construction of the Mover Assembly:

FIG. 3 illustrates an exploded view of the mover assembly 101, in accordance with an example embodiment. FIG. 3 is described below in conjunction with FIG. 1. The mover assembly 101 comprises a plurality of mover assembly units 301a, 301b, 301c, 301d, 301e, 301f, 301g, 301h, 301i, 301j, 301k, 301l and a mover assembly end unit 303. For the ease of describing, only 7 mover assembly units (301a-301l) are illustrated in FIG. 3. However, the number of mover assembly units may be further increased or decreased based on an intended application of the mover assembly 101, without deviating from the scope of the present disclosure. Thus, the mover assembly 101 is modular and size of the mover assembly 101 is adjustable depending on the type of application intended for use.

Each of the mover assembly units 301a-301l is composed of three small sections comprising: the non-ferromagnetic core 107, the ferromagnetic laminated structures (109a-109c), and the winding 105 of the wire. The plurality of mover assembly units 301a-301l is stacked together with the help of guiding teeth and grooves on the ferromagnetic laminated structures 109 of each mover assembly unit of the plurality of assembly units to form the mover assembly 101. The mover assembly 101 further comprises the mover assembly end unit 303, where the mover assembly end unit 303 is attached to the last mover assembly unit 301l. Details of the arrangement of the plurality of mover assembly units 301a-301l and the mover assembly end unit 503 is provided below with reference to FIG. 4.

Figure 4:
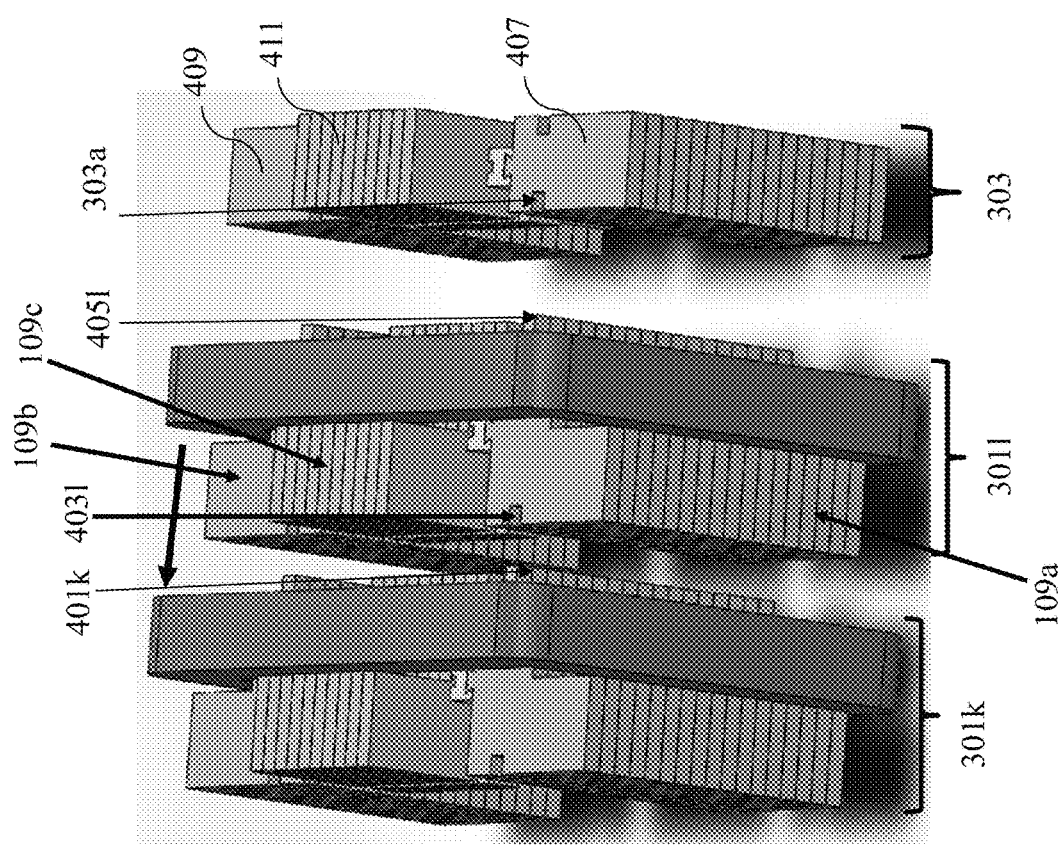
FIG. 4 illustrates an arrangement of the mover assembly units and a mover assembly end unit to form the mover assembly, in accordance with an example embodiment.

FIG. 4 illustrates arrangement of the mover assembly units 301k, 301l and the mover assembly end unit 303 to form the mover assembly 101, in accordance with an example embodiment. FIG. 4 is described below in conjunction with FIG. 3. The mover assembly end unit 303 is fitted into the final mover assembly unit 301l. To that end, a projection 405 l of the mover assembly unit 301l corresponding to the first ferromagnetic laminated structure 109a is used as guiding teeth, where the projection 405 l slides into a groove 303a corresponding to a ferromagnetic laminated structure 407 of the mover assembly end unit 303. Similarly, projections corresponding to other ferromagnetic laminated structures 109b and 109c of the mover assembly unit 301l slide into grooves corresponding to ferromagnetic laminated structures 409 and 411 of the mover assembly end unit 303.

Similarly, a projection 401k corresponding to the first ferromagnetic structure 109a of the mover assembly unit 301*k* is slid into a groove 403*l* corresponding to the first ferromagnetic structure 109*a* of the mover assembly unit 301*l*. Further, projections corresponding to other ferromagnetic laminated structures 109*b* and 109*c* of the mover assembly unit 301*k* slide into grooves corresponding to ferromagnetic laminated structures 109*b* and 109*c* of the mover assembly unit 301*l*. In this way, the plurality of mover assembly units 301*a*-301*l* and the mover assembly end unit 303 are connected to form the mover assembly 101.

Further, a detailed description of construction of each mover assembly unit of the mover assembly 101 is provided below with reference to FIG. 5 to FIG. 12.

Figure 5:
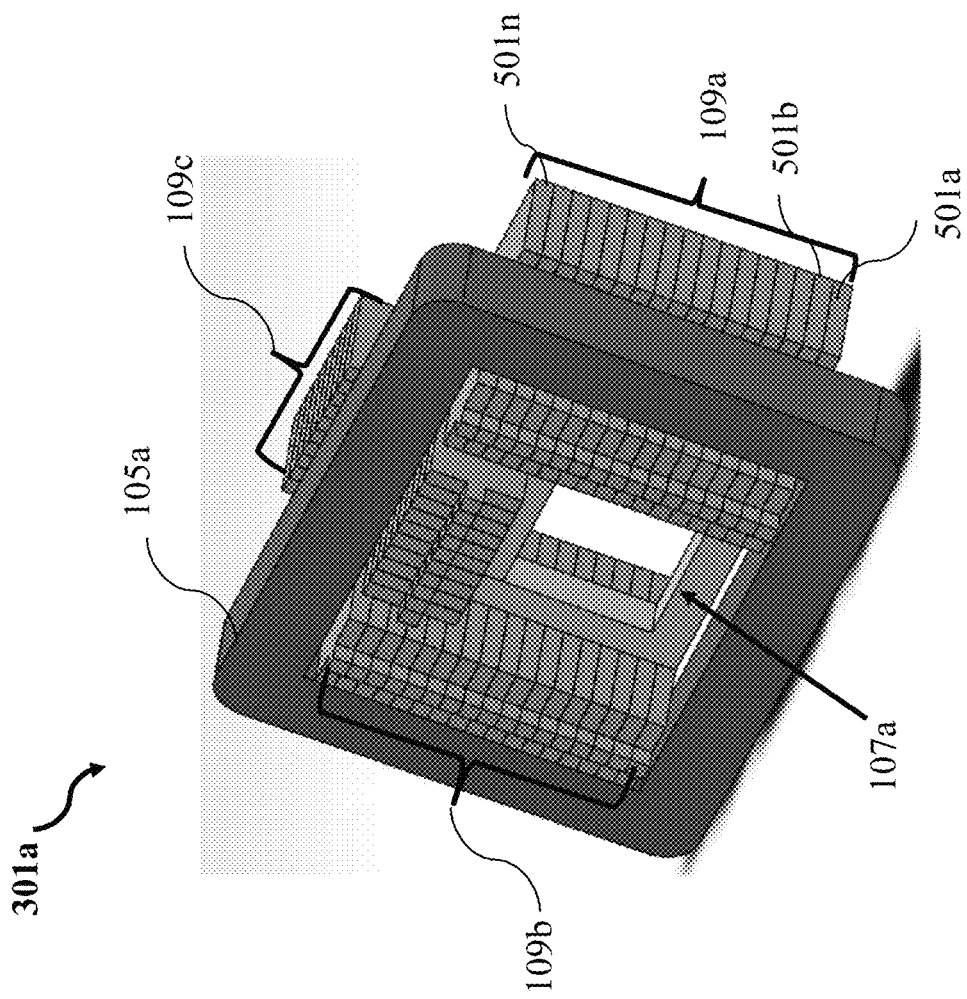
FIG. 5 illustrates the mover assembly unit of the mover assembly, in accordance with an example embodiment.

Construction of a Mover Assembly Unit of the Mover Assembly:

FIG. 5 illustrates the mover assembly unit 301*a* of the mover assembly 101, in accordance with an example embodiment. Construction of each mover assembly unit 301*a*-301*l* is identical to construction of the mover assembly unit 301*a* described below. The mover assembly unit 301*a* mainly consists of three components: the non-ferromagnetic core 107*a*, the ferromagnetic laminated structures 109 (i.e., the first ferromagnetic laminated structures 109*a*, the second ferromagnetic laminated structures 109*b*, and the third ferromagnetic laminated structures 109*c*), and the windings 105*a*. The ferromagnetic laminated structures 109*a*-109*c* are arranged in at least three different directions to support a rectangular shaped winding 105*a*.

Each piece of the ferromagnetic laminated structures 109*a*-109*c* is made up of a plurality of ferromagnetic plates. For example, the ferromagnetic laminated structure 109*a* is made up of a plurality of ferromagnetic plates 501*a*, 501*b*, . . . , 501*n*, where each ferromagnetic plate 501*a*-501*n* is laminated by non-conductive materials such as electric lamination sheets that are arranged in different directions to minimize the eddy current loss. Other ferromagnetic laminated structures 109*b* and 109*c* are formed in the identical manner. The lamination sheets are made up of at least one of the following materials: Cobalt, Nickel alloy, or Silicon steel.

The ferromagnetic laminated structures 109*a*-109*c* are attached to a supporting frame, the non-ferromagnetic core 107*a*, that is manufactured using non-ferromagnetic materials such as Aluminum. The structure of the non-ferromagnetic core 107*a* and an arrangement of the ferromagnetic laminated structures 109*a*-109*c* on the non-ferromagnetic core 107*a* are described later.

Further, the windings 105*a* are arranged in a space formed by the arrangement of the ferromagnetic laminated structures 109*a*-109*c* on the non-ferromagnetic core 107*a*. The windings 105*a* are formed by winding a wire around the three ferromagnetic laminated structures 109*a*-109*c*, where the wire is made from an electrically conductive material.

Some embodiments of the present disclosure are based on the realization that by constructing the mover assembly 101 with the mover assembly units like the mover assembly unit 301*a* that comprises at least two ferromagnetic laminated structures (109*a*-109*c* or 109*b*-109*c*) on intersecting planes, a flexibility to manufacture the mover assembly unit 301*a* of any shape is achieved, and consequently a flexibility to design any shape of the mover assembly 101 is achieved. Thus, the motor assembly 100 comprising different size and shape configurations of the mover assembly 101 can be achieved for use in numerous applications to generate the thrust force.

Further, the proposed design of the motor assembly 100 not only reduces the eddy current losses but also adjusts directions of the currents generated by the motion of the mover assembly 101 in the stator 103 such that higher density of thrust force is generated.

To that end, laminations are used to reduce eddy current losses in the motor assembly 100. Specific lamination directions are chosen according to magnetic field pattern, which in turn is produced by current flowing through the windings 105*a*. The motor assembly 100 comprises multiple active planes, producing thrust force, that are in different directions, where the active planes correspond to interfaces between the mover assembly 101 and the stator 103 of the motor assembly 100. The magnetic fields are generated in different directions in the ferromagnetic structures coming in contact with the stator 103 during the operation of the mover assembly 101. Therefore, the ferromagnetic structures are laminated to generate multiple laminated structures (109*a*-109*c*), in each mover assembly unit 301*a*-301*n*, where the multiple laminated structures (109*a*-109*c*) in different directions according to the magnetic field direction are used in the motor assembly 101 to reduce eddy current losses in all direction.

Figure 6:
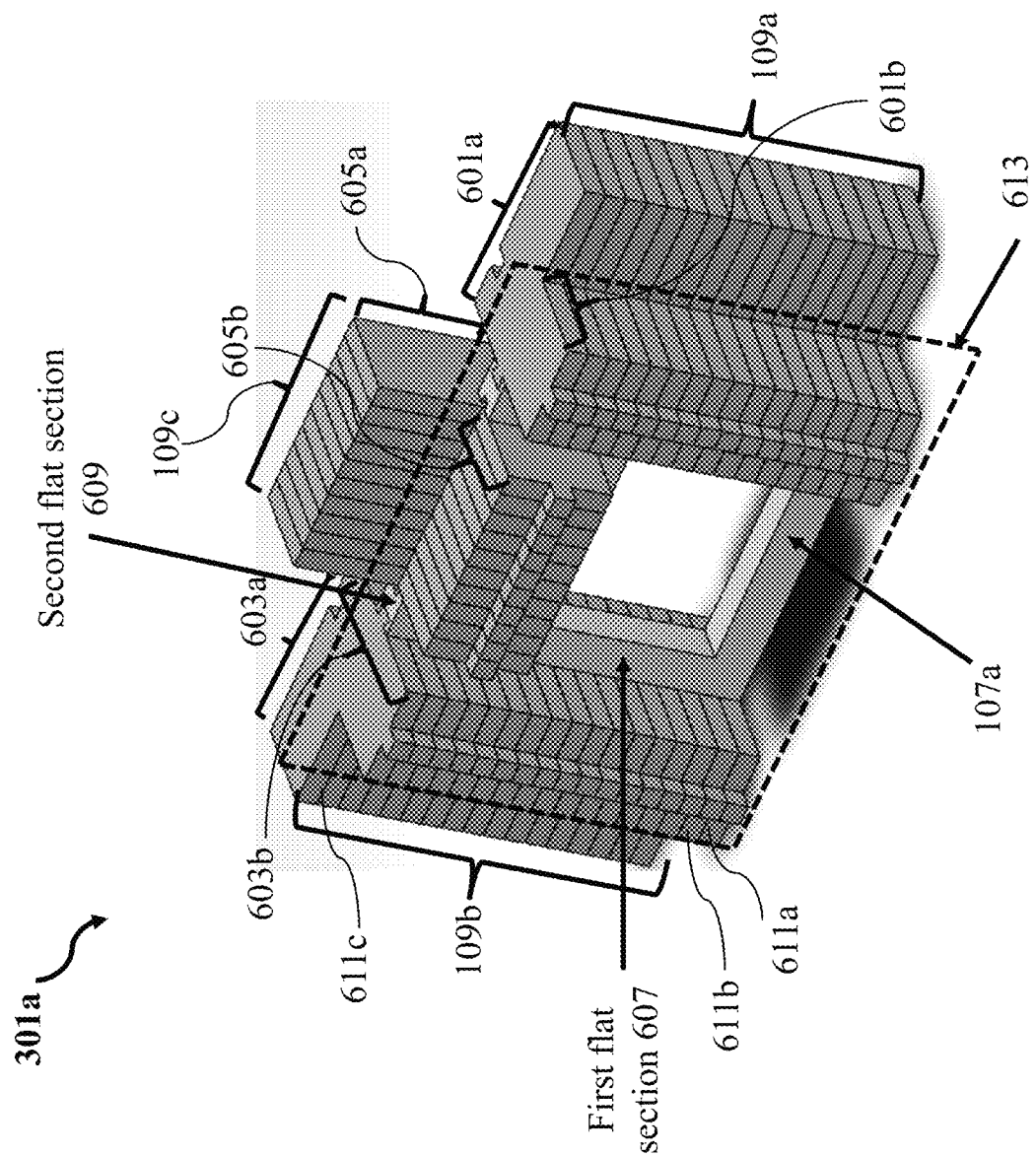
FIG. 6 illustrates the ferromagnetic laminated structures arranged on the non-ferromagnetic core of the mover assembly unit of the mover assembly, in accordance with an example embodiment.

FIG. 6 illustrates the ferromagnetic laminated structures (109*a*-109*c*) arranged on the non-ferromagnetic core 107*a* of the mover assembly unit 301*a* of the mover assembly 101, in accordance with an example embodiment. The mover assembly unit 301*a* comprises the non-ferromagnetic core 107*a* with at least two flat sections, for example, a first flat section 607 and a second flat section 609 lying on intersecting planes. Over the at least two flat sections 607 and 609 lying on intersecting planes of the non-ferromagnetic core 107*a*, at least two ferromagnetic laminated structures 109*b* and 109*c* are arranged, respectively. Each of the at least two ferromagnetic laminated structures 109*b* and 109*c* includes a stack of ferromagnetic plates, for example, the ferromagnetic laminated structure 109*b* is formed by stacking plates 611*a*, 611*b*, . . . , 611*n*. Similarly, the ferromagnetic laminated structure 109*c* is formed (FIG. 5). Each ferromagnetic plate (611*a*-611*n*) in the stack is covered with a non-conductive coating. The non-conductive coating electrically isolates each ferromagnetic plate from other ferromagnetic plates in the stack.

Further, each of the at least two ferromagnetic laminated structures 109*b* and 109*c* is arranged on a corresponding flat section 607 and 609 of the at least two flat sections of the non-ferromagnetic core 107*a* such that side of each ferromagnetic plate is adjacent to the non-ferromagnetic core 107*a* thereby making the ferromagnetic plates of the at least two ferromagnetic laminated structures 109*b* and 109*c* lie on intersecting planes perpendicular to the intersecting planes of the at least two flat sections 607 and 609 of the non-ferromagnetic core 107*a*. Further, the windings 105*a* of wire (not shown in FIG. 6) are wrapped around the at least two ferromagnetic laminated structures 109*b* and 109*c* and the non-ferromagnetic core 107*a*.

Further, in FIG. 6, each of the three ferromagnetic laminated structures 109*a*-109*c* are, roughly, of an L-shape. For example, in the first ferromagnetic laminated structure 109*a*, a section 601*a* and a section 601*b* form the L shape, in the second ferromagnetic laminated structure 109*b*, a section 603*a* and a section 603*b* form the L shape, and likewise in the third ferromagnetic laminated structure 109*c*, a section 605*a* and a 605*b* form the L shape. As can be observed from the FIG. 6, a space is formed between two legs of the L shaped structure. For example, a space (indicated by a dotted line) is formed between sections 601*a* and 601*b* of the first ferromagnetic laminated structure 109*a*. Similarly, a space is formed between sections 603*a* and 603*b* of the second ferromagnetic laminated structure 109*b*, and a space is formed between sections 605a and 605b of the third ferromagnetic laminated structure 109c. On combining or arranging the three L-shaped structures (109a-109c), a space 613 is formed in the mover assembly unit 301a, where the winding 105a is wound (FIG. 5).

Further, each mover assembly unit of the plurality of mover assembly units 301a-301l are modular in nature i.e., size and length of each mover assembly unit is adjustable. Details of the modular arrangement of each mover assembly unit is provided below with reference to FIG. 7.

Figure 7:
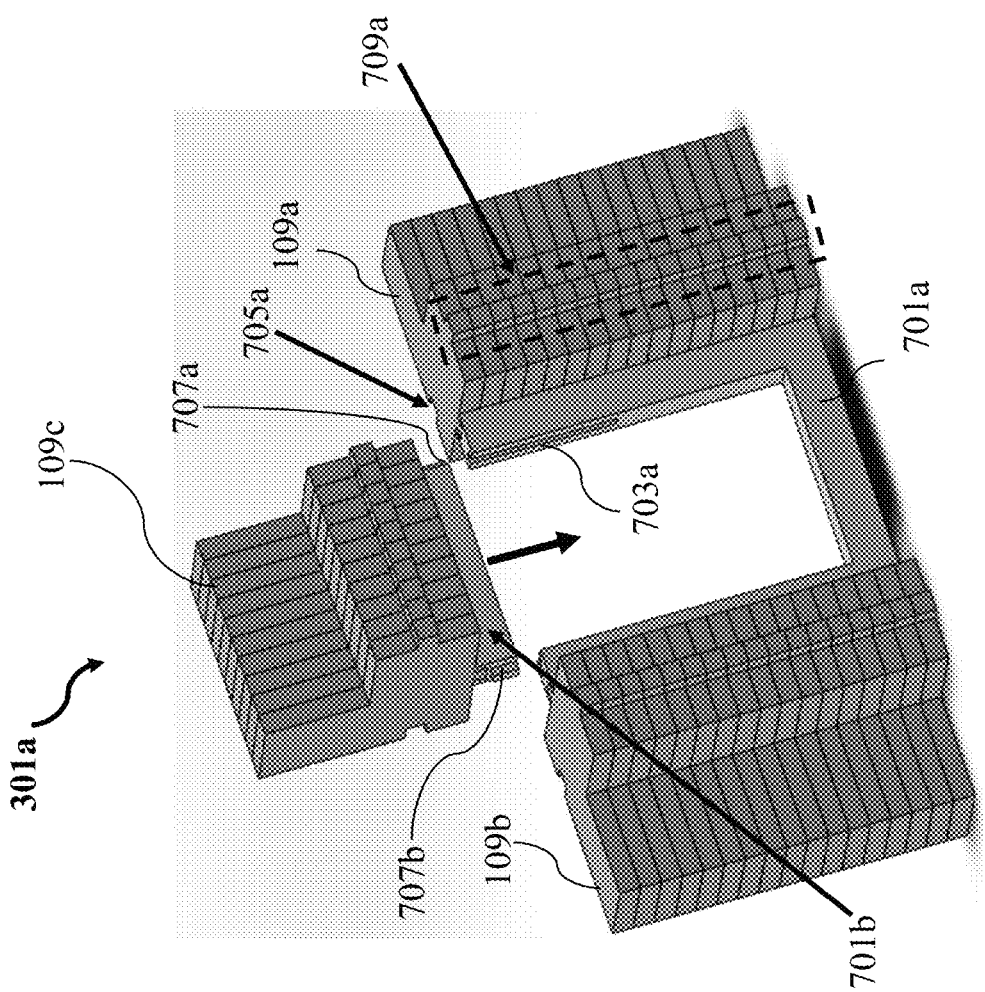
FIG. 7 illustrates assembling of the mover assembly unit, in accordance with an example embodiment.

FIG. 7 illustrates assembling of the mover assembly unit 301a, in accordance with an example embodiment. FIG. 7 is described below in conjunction with FIG. 6. The non-ferromagnetic core 107a is made up of two sections 701a and 701b, where the section 701a is a U-shaped non-ferromagnetic core and the section 701b is a rectangular rod-shaped non-ferromagnetic core, where the two sections 701a and 701b are detachably attached to each other to form the non-ferromagnetic core 107a. The rectangular rod-shaped non-ferromagnetic core 701b corresponds to the second flat section 609 (FIG. 6). The size of each section 701a and 701b can be modified (increased or decreased) based on design requirement of the motor assembly 101. The section 701b comprises projections 707a and 707b that slide into grooves on the inner walls of the section 701a, for example, the projection 707a slides into a groove 703a, similarly, the projection 707b slides into corresponding groove (not visible in FIG. 7) on the inner wall of the section 701a, to form the non-ferromagnetic structure 107a of the mover assembly unit 301a. The arrangement of the mover assembly unit 301a ensures that the ferromagnetic laminated structures lying on intersecting planes of the non-ferromagnetic core 107a are electrically isolated, i.e., the third ferromagnetic laminated structure 109c is electrically isolated from the first ferromagnetic laminated structure 109a and the second ferromagnetic laminated structure 109b.

Further, the first ferromagnetic laminated structure 109a comprises a projection 709a (on front side of the mover assembly unit 301a) and a groove 705a (on back side of the mover assembly unit 301a), where the projection 709a of one mover assembly unit (for example, 301a) acts as guiding teeth that fit into the slot 705a of another mover assembly unit (for example, 301b). The other ferromagnetic laminated structures 109b and 109c also comprise identical projections and slots.

Figure 8:
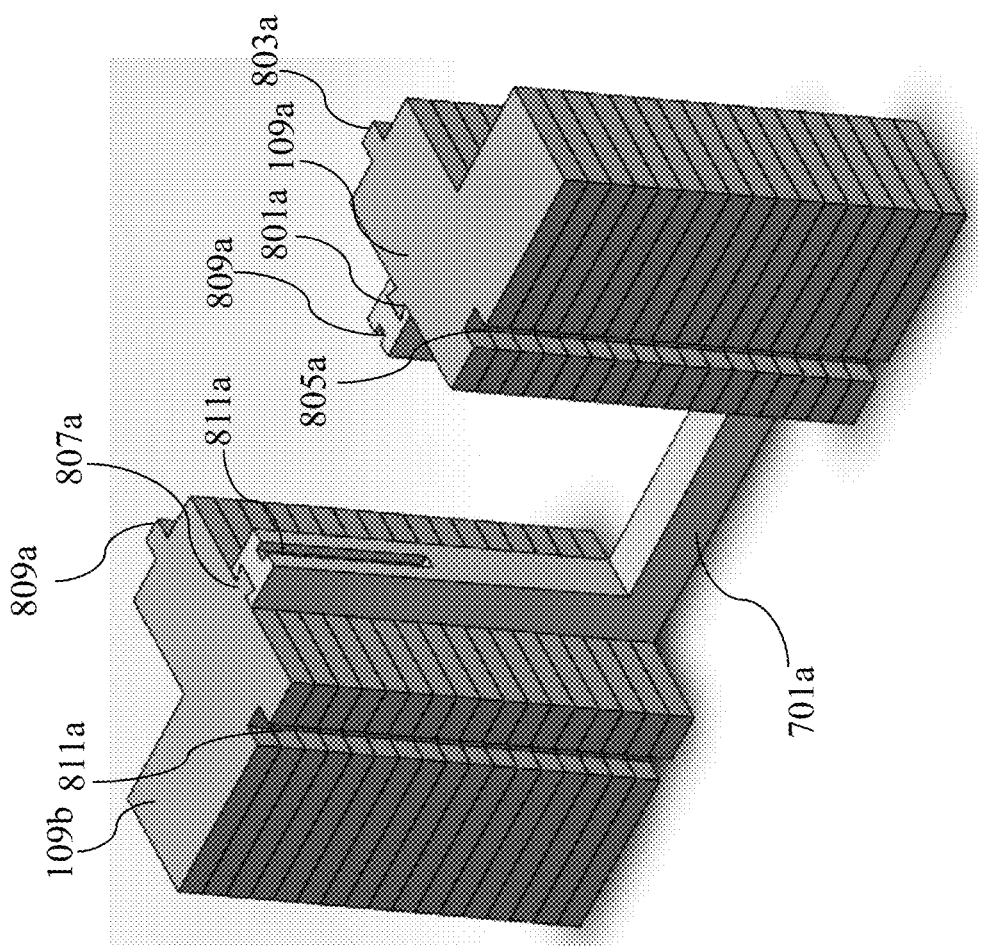
FIG. 8 illustrates arrangement of a first ferromagnetic laminated structure and a second ferromagnetic laminated structure on a section of the non-ferromagnetic core of the mover assembly unit of the mover assembly, in accordance with an example embodiment.

FIG. 8 illustrates arrangement of the first ferromagnetic laminated structure 109a and the second ferromagnetic laminated structure 109b on the section 701a of the non-ferromagnetic core 107a of the mover assembly unit 301a of the mover assembly 101, in accordance with an example embodiment. FIG. 8 is described below in conjunction with FIG. 7. The two ferromagnetic laminated structures 109a and 109b are made from a plurality of ferromagnetic plates, where shape of each ferromagnetic plate is illustrated later in FIG. 10. The first ferromagnetic laminated structure 109a comprises projections 801a, 803a, and a slot 805a, where the projection 801a slides into a groove on outer profile of the section 701a of the non-ferromagnetic core 107a. Further, the projection 803a corresponds to the projection 709a (FIG. 7) and the slot 805a correspond to the slot 705a (FIG. 7) Similarly, the second ferromagnetic laminated structure 109b comprises projections 807a, 809a, and a slot 811a, where the projection 807a slides into a groove on outer profile of the section 701a of the non-ferromagnetic core 107a. Further, the section 701a comprises grooves 809a and 811a on its inner walls, where the groove 809a correspond to the groove 703a (FIG. 7).

Figure 9:
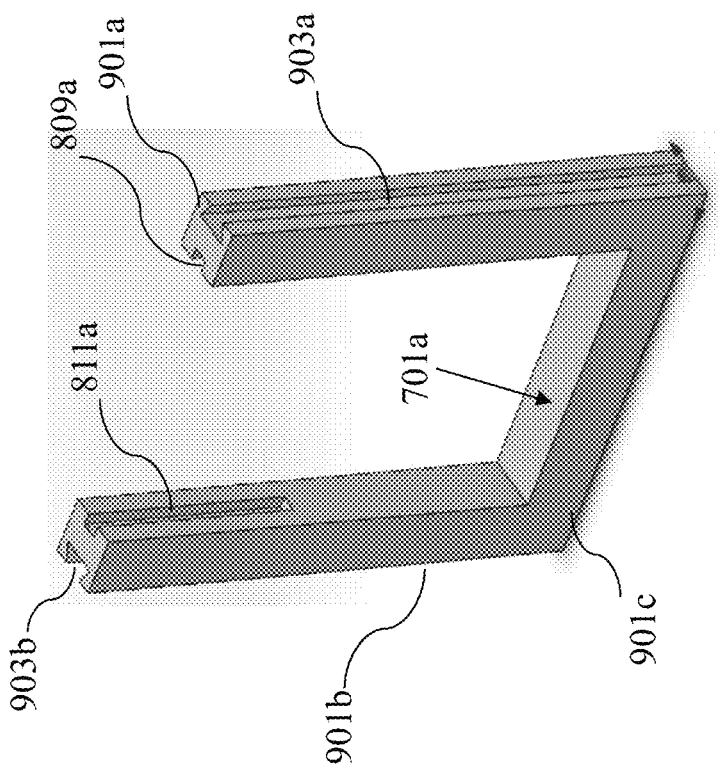
FIG. 9 illustrates U-shaped non-ferromagnetic core of the mover assembly unit, in accordance with an example embodiment.

FIG. 9 illustrates the U-shaped non-ferromagnetic core 701a of the mover assembly unit 301a, in accordance with an example embodiment. The section 701a of the non-ferromagnetic core 107a has a U-shaped profile of the outer surface with three flat sections, a first flat section 901a, a second flat section 901b, and a third flat section 901c, where the first flat section 901a and the second flat section 901b are parallel to each other, and where the third flat section 901c lies on a plane that intersects with a plane on which the first flat section 901a lies and a plane on which the second flat section 901b lies. The second flat section 901b corresponds to the first flat section 607 in FIG. 6.

The non-ferromagnetic core 701a comprises a first groove 903a on an outer surface of the first flat section 901a and a second groove 903b on an outer surface of the second flat section 901b. The groove 903a is configured to accommodate the projection 801a (FIG. 8) of the first ferromagnetic laminated structure 109a, and the groove 903b is configured to accommodate the projection 807a of the second ferromagnetic laminated structure 109b.

The projections such as 801a, 803a, 807a, and 809a and the slots such as 805a and 811a on each of the ferromagnetic laminated structures (109a and 109b) are formed by stacking of the plurality of ferromagnetic plates, where each ferromagnetic plate is of a specific shape.

Figure 10:
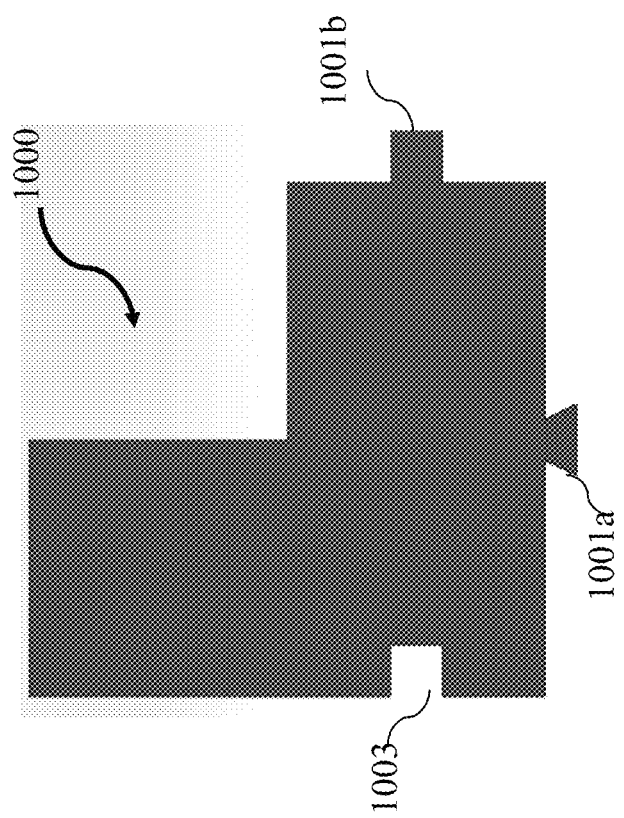
FIG. 10 illustrates a shape of a ferromagnetic plate used to form the ferromagnetic laminated structures, in accordance with an example embodiment.

FIG. 10 illustrates a shape of a ferromagnetic plate 1000 used to form the ferromagnetic laminated structures 109a-109c, in accordance with an example embodiment. The ferromagnetic laminated structures 109a-109c are manufactured by stacking a plurality of ferromagnetic plates, where each ferromagnetic plate 1000 of the plurality of ferromagnetic plates is laminated using a lamination sheet. Each ferromagnetic plate 1000 is, roughly, of an L shape and comprises two projections 1001a and 1001b, and a slot 1003. Stacking of the plurality of ferromagnetic plates such that the projections 1001b, 1001a, and the slot 1003 of each ferromagnetic plate 1000 fall on another ferromagnetic plate 1000 in the stack of the plurality of ferromagnetic plates results into the projections 801a, 803a and the slot 805a of the first ferromagnetic laminated structure 109a, respectively. The second ferromagnetic laminated structure 109b and the third ferromagnetic laminated structure 109c are also stacked in the identical manner.

In this way, the first ferromagnetic laminated structure 109a and the second ferromagnetic laminated structure 109b are arranged on the section 701a of the non-ferromagnetic core 107a. Further, arrangement of the third ferromagnetic laminated structure 109c on the section 701b of the non-ferromagnetic core is provided below with references to FIG. 11 and FIG. 12.

Figure 11:
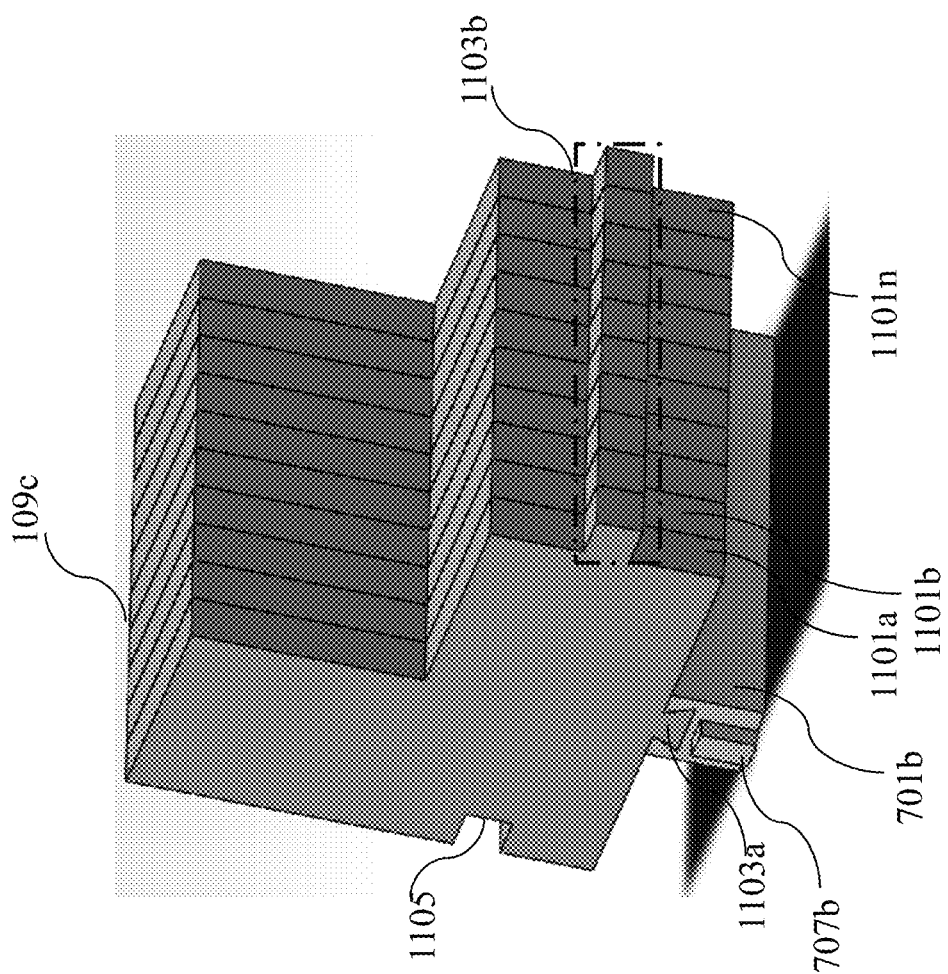
FIG. 11 illustrates the third ferromagnetic laminated structure arranged on the non-ferromagnetic core, in accordance with an example embodiment.

FIG. 11 illustrates the third ferromagnetic laminated structure 109c arranged on the section 701b of the non-ferromagnetic core 107a, in accordance with an example embodiment. The third ferromagnetic laminated structure 109c is like the first ferromagnetic laminated structure 109a and the second ferromagnetic laminated structure 109b. However, the length of the third ferromagnetic laminated structure 109c is less than the ferromagnetic laminated structures 109a and 109b. Accordingly, the third ferromagnetic laminated structure 109c is formed in the manner identical to the first ferromagnetic laminated structure 109a. Thus, third ferromagnetic laminated structure 109c is formed by stacking together a plurality of ferromagnetic plates 1101a, 1101b, . . . , 1101n. Each ferromagnetic plate of the plurality of ferromagnetic plates 1101a-1101n is laminated with non-conductive coating such as laminating sheets. Further, shape of each ferromagnetic plate of the plurality of ferromagnetic plates 1101a-1101n is like the shape of the ferromagnetic plate 1000 illustrated in FIG. 10. Thus, stacking of the plurality of ferromagnetic plates 1101a-1101n results into the third ferromagnetic laminated structure 109c with projections 1103a, 1103b and slot 1105 is formed. The projection 1103a slides into a groove on the non-ferromagnetic core 701b such that the third ferromagnetic laminated structure 109c is supported by the non-ferromagnetic core 701b.

Figure 12:
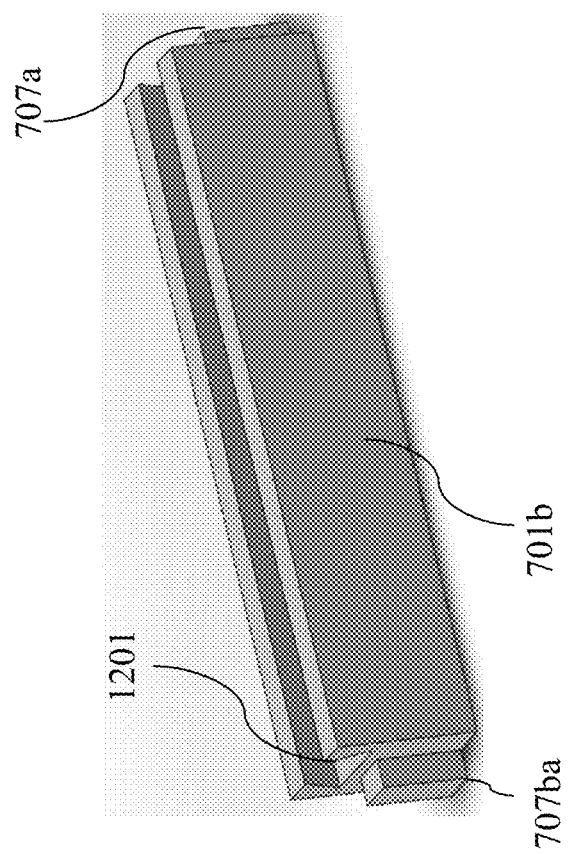
FIG. 12 illustrates a rectangular rod-shaped section of the non-ferromagnetic core, in accordance with an example embodiment.

FIG. 12 illustrates the rectangular rod-shaped section 701b of the non-ferromagnetic core 107a, in accordance with an example embodiment. FIG. 12 is described below in conjunction with FIG. 9 and FIG. 11. The section 701b comprises a groove 1201, where the projection 1103a of the third ferromagnetic laminated structure 109c slides into the groove 1201. The section 701b further comprises the projections 707a and 707b on sides, where the projections 707a and 707b allow the non-ferromagnetic core 707b to slide into the grooves (811a and 809a (FIG. 9)) of the non-ferromagnetic core 701a (i.e., in a gap opposite to the third flat section 901c of the non-ferromagnetic core 107) such that the two ferromagnetic laminated structures lying on the interesting planes are electrically isolated from each other.

In this way, each mover assembly unit of the mover 101 is constructed. Further, the mover assembly 101 comprises the mover assembly end unit 503 that is attached to the last mover assembly unit 301l. Construction of the mover assembly end unit 503 is described below with references to FIG. 13 and FIG. 14.

Figure 13:
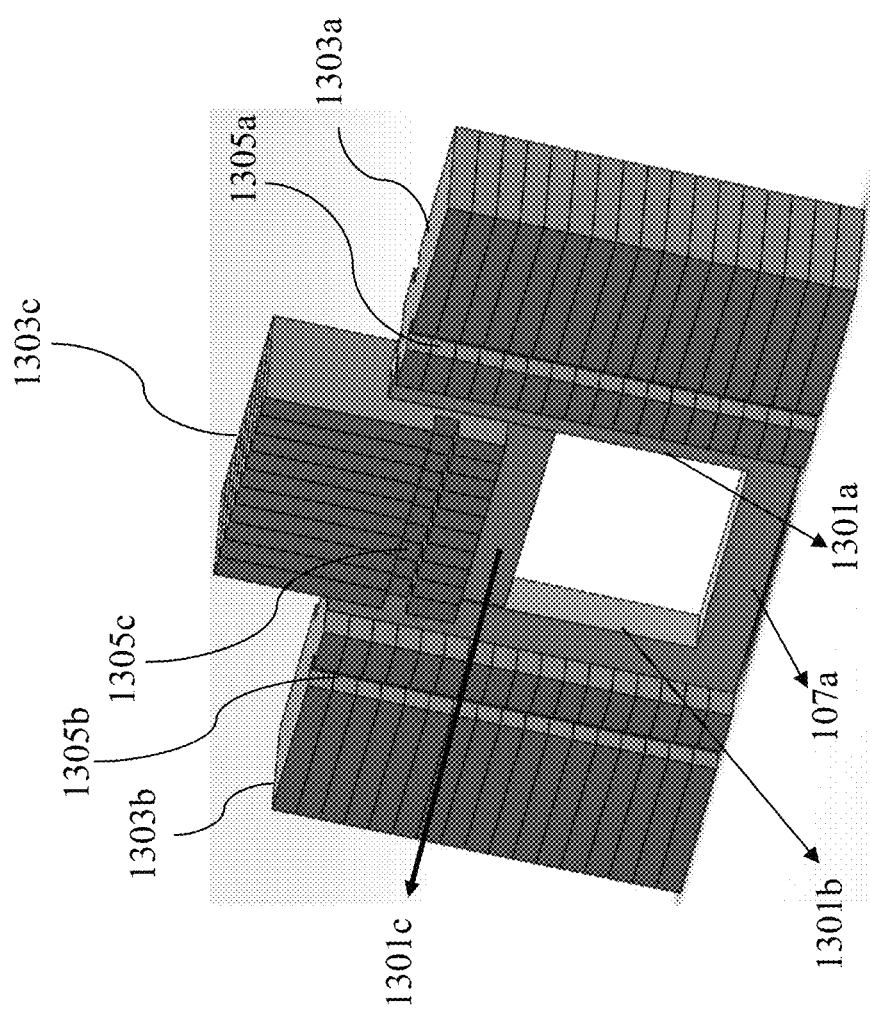
FIG. 13 illustrates a fully assembled mover assembly end unit of the mover assembly, in accordance with an example embodiment.

II. Construction of a Mover Assembly End Unit:

FIG. 13 illustrates a fully assembled mover assembly end unit 503 of the mover assembly 101, in accordance with an example embodiment. Construction of the mover assembly end unit 503 is identical to the construction of the mover assembly unit 301a. However, a shape of the ferromagnetic plate used for constructing ferromagnetic laminated structures of the mover assembly end unit is different.

Thus, mover assembly end unit 503 comprises the non-ferromagnetic core 107a on which a first ferromagnetic laminated structure 1303a is arranged on a first flat section 1301a of the non-ferromagnetic core 107a, a second ferromagnetic laminated structure 1303b is arranged on a second flat section 1301b of the non-ferromagnetic core 107a, and a third ferromagnetic laminated structure 1303c is arranged on a third flat section 1301c of the non-ferromagnetic core 107a. Each of the three ferromagnetic laminated structures 1303a-1303c is made up of a plurality of ferromagnetic plates in a manner identical to the mover assembly unit 301a. Shape of each ferromagnetic plate is illustrated later in FIG. 14. Further, each ferromagnetic plate is laminated with lamination sheets.

The stacking of the plurality of ferromagnetic plates results into a slot 1305a of the first ferromagnetic laminated structure 1303a, a slot 1305b of the second ferromagnetic laminated structure 1303b, and a slot 1305c of the third ferromagnetic laminated structure 1303c. Through each slot 1305a-1305c guiding teeth of the last mover assembly unit 301l are fitted to form the mover assembly unit 101.

Figure 14:
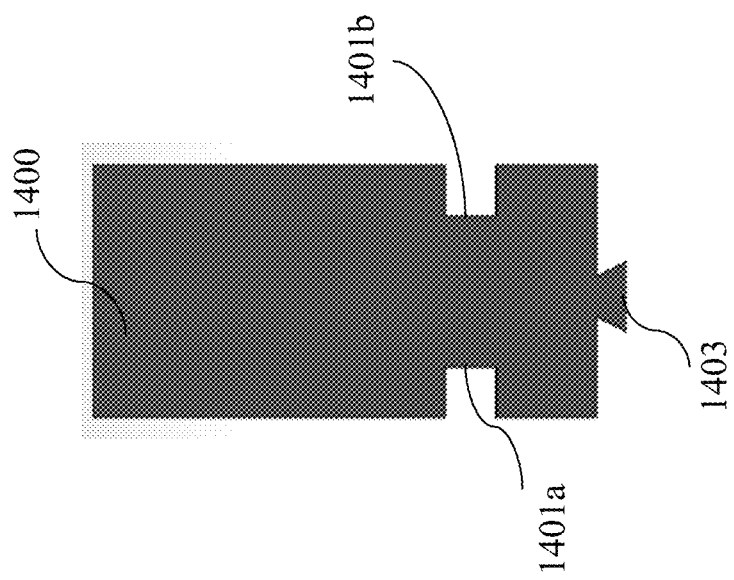
FIG. 14 illustrates a shape of a ferromagnetic plate of the mover assembly end unit of the mover assembly, in accordance with an example embodiment.

FIG. 14 illustrates a shape of a ferromagnetic plate 1400 of the mover assembly end unit 503 of the mover assembly 101, in accordance with an example embodiment. The ferromagnetic plate 1400 comprises two slots 1401a and 1401b on two opposite sides of the ferromagnetic plate 1400. Further, the ferromagnetic plate 1400 comprises a projection 1403. A plurality of ferromagnetic plates, each ferromagnetic plate 1400 with the shape as shown in FIG. 14, are stacked to form each of the three ferromagnetic laminated structures 1303a-1303c (FIG. 13).

Figure 15:
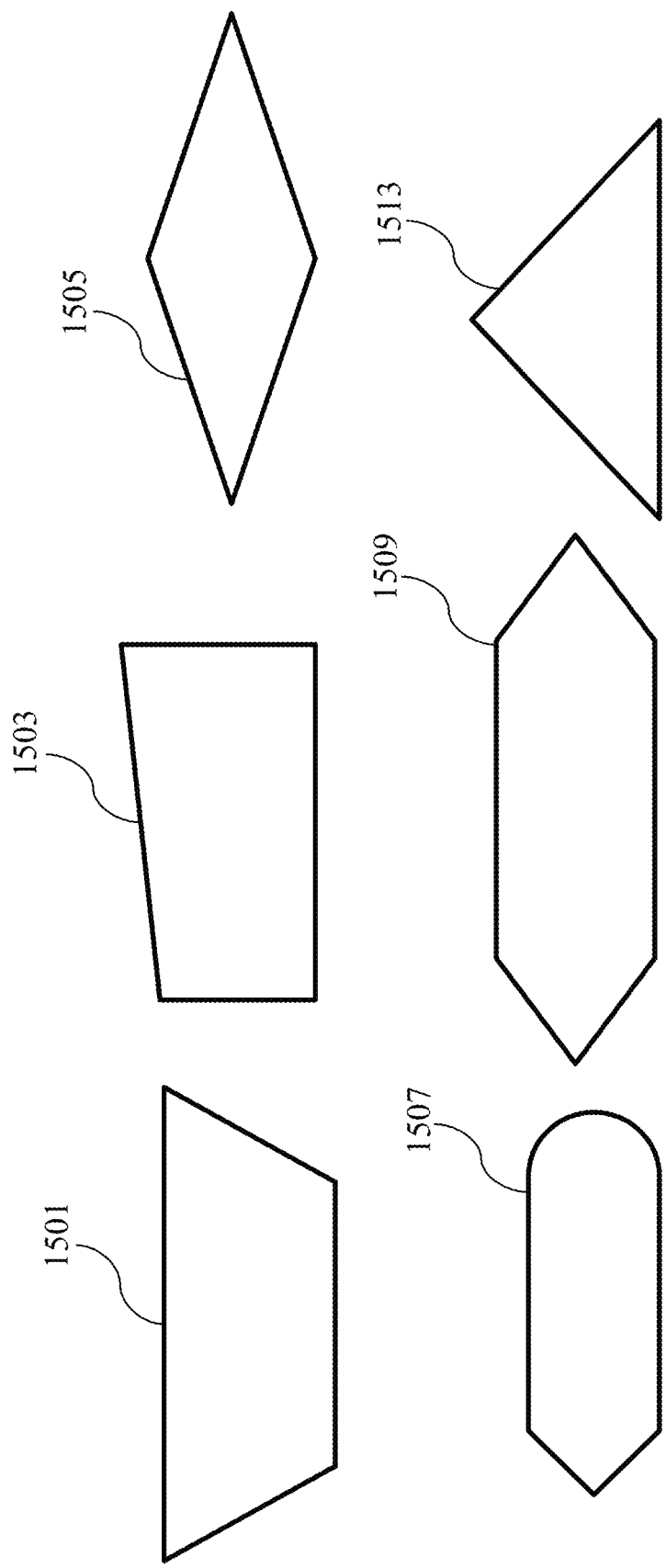
FIG. 15 illustrates shapes of the mover assembly with at least two intersecting surfaces, in accordance with an example embodiment.

Exemplar Embodiments:

FIG. 15 illustrates shapes of the mover assembly 101 with at least two intersecting surfaces, in accordance with an example embodiment. A shape of the mover assembly 101, comprising the non-ferromagnetic core with at least two sections lying on intersecting planes and at least two ferromagnetic laminated structures (for example, 109a-109c or 109b-109c) arranged on the at least two flat sections of the non-ferromagnetic core, corresponds to a polyhedron. FIG. 15 illustrates shapes of polyhedron from front view (or in 2D). For example, some shapes of the mover assembly 101 may correspond to a trapezium (shape 1501), a diamond shape (shape 1505), a hexagon (shape 1509), and a triangle (shape 1513), and other polygons of shape 1503, shape 1507, and the likes. The different shapes of the mover assembly 101 shown in FIG. 15 are illustrated for exemplar purpose only. However, it may be understood by one of ordinary skill in the art that any other equivalent shape of the mover assembly 101 may also be used to achieve the same objective as described in various embodiments above, without deviating from the scope of the present disclosure. Further, a stator of a specific shape corresponding to a specific shape of a mover of shapes 1501-1511 is designed such that the specific stator allows the specific mover to move along the specific stator to generate the thrust force.

Some embodiments are based on the realization that the motor assembly 100 with different combinations of stator and mover can be used to generate the thrust force. For example, a functionality of the mover and the stator may be interchanged i.e., the mover may be configured with arrays of magnets and a stator may be configured with coils (FIG. 16).

Figure 16:
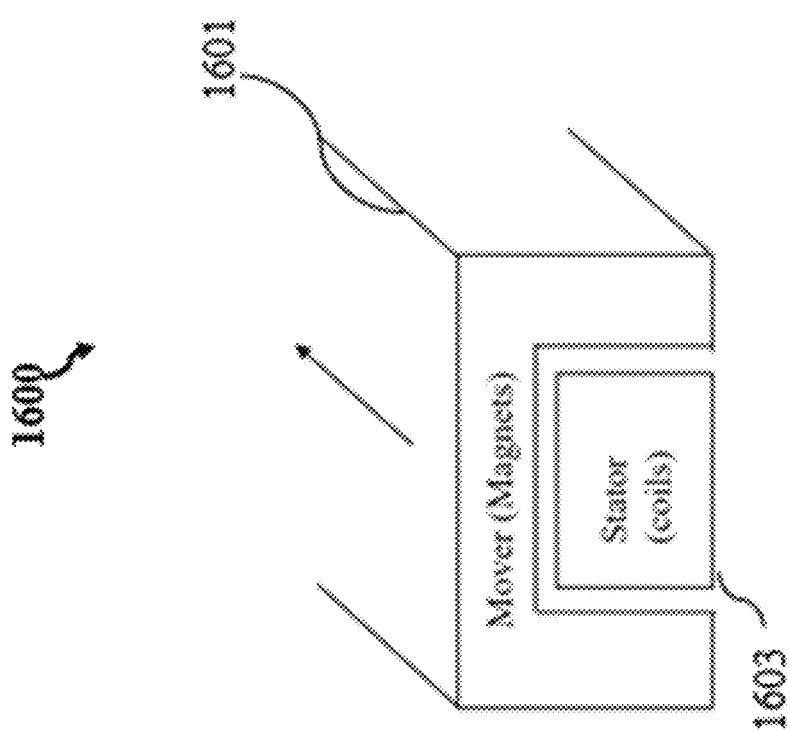
FIG. 16 illustrates a block diagram of an alternate motor assembly, in accordance with an example embodiment.

FIG. 16 illustrates a block diagram of an alternate motor assembly 1600, in accordance with an example embodiment. FIG. 16 is described below in conjunction with FIGS. 1-3. The motor assembly 1600 comprises a mover assembly 1601 and a stator 1603. The mover assembly 1601 is smaller in size compared to the stator 1603, where the mover assembly 1601 is configured to slide during an operation of the motor assembly 1600 along outer walls of the stator 1603, and where inner walls of the mover assembly 1601 comprises a track (also referred to as "rail"). The track on the inner walls of the mover assembly 1601 comprises at least two arrays of magnet along the inner walls of the mover assembly 1603.

Further, the stator 1603 comprises a non-ferromagnetic core 107 with a profile of an outer surface having at least two flat sections lying on intersecting planes. The profile of the stator 1603 is similar to the profile of the mover assembly 101 (as shown in FIG. 1 and FIG. 6). On the at least two flat sections of the non-ferromagnetic core 107 at least two ferromagnetic laminated structures, for example, a first ferromagnetic laminated structure 109a, a second ferromagnetic laminated structure 109b, and a third ferromagnetic laminated structure 109c are arranged. Each of the at least two ferromagnetic laminated structures (for example 109a, 109b, and 109c) includes a stack of ferromagnetic plates. For example, the stack of ferromagnetic plates 501a-501n shown in FIG. 5 for mover assembly 101 may be similarly used for constructing the stator 1603 having the stack of ferromagnetic plates. Each ferromagnetic plate in the stack is covered with a non-conductive coating, wherein each of the at least two ferromagnetic laminated structures is arranged on a corresponding flat section of the at least two flat sections of the non-ferromagnetic core 107. In this manner, a side of each ferromagnetic plate is adjacent to the non-ferromagnetic core 107 thereby making the ferromagnetic plates of the at least two ferromagnetic laminated structures lie on intersecting planes perpendicular to the intersecting planes of the at least two flat sections of the non-ferromagnetic core 107.

Further, the stator 1603 comprises winding 105 of wire (also referred to s "coils") wound around the non-ferromagnetic core 107 and the at least two ferromagnetic laminated structures (for example, 109a, 109b, and 109c), where the wire is made from any electrically conductive material such as copper.

In some embodiments, the stator is made up of a plurality of stator units (similar to the plurality of mover assembly units 301a-301n), where each stator unit has a structure as outlined above.

The motor assembly 100 is configured such that when the mover assembly 1601 moves along the outer walls of the stator 1603, at least two sides of the stator 1603 interact with the at least two arrays of magnet of the mover assembly 1601. The interaction between the stator 1601 and the arrays of magnets on the inner walls of mover assembly 1601 generates a thrust force in a direction shown in the FIG. 1, where the thrust force is used to drive a load for example, a linear direct drive motor.

In this way, functionality of elements of the motor assembly 100 (i.e., the mover assembly 101 and the stator 103) can be interchanged.

Figure 17:
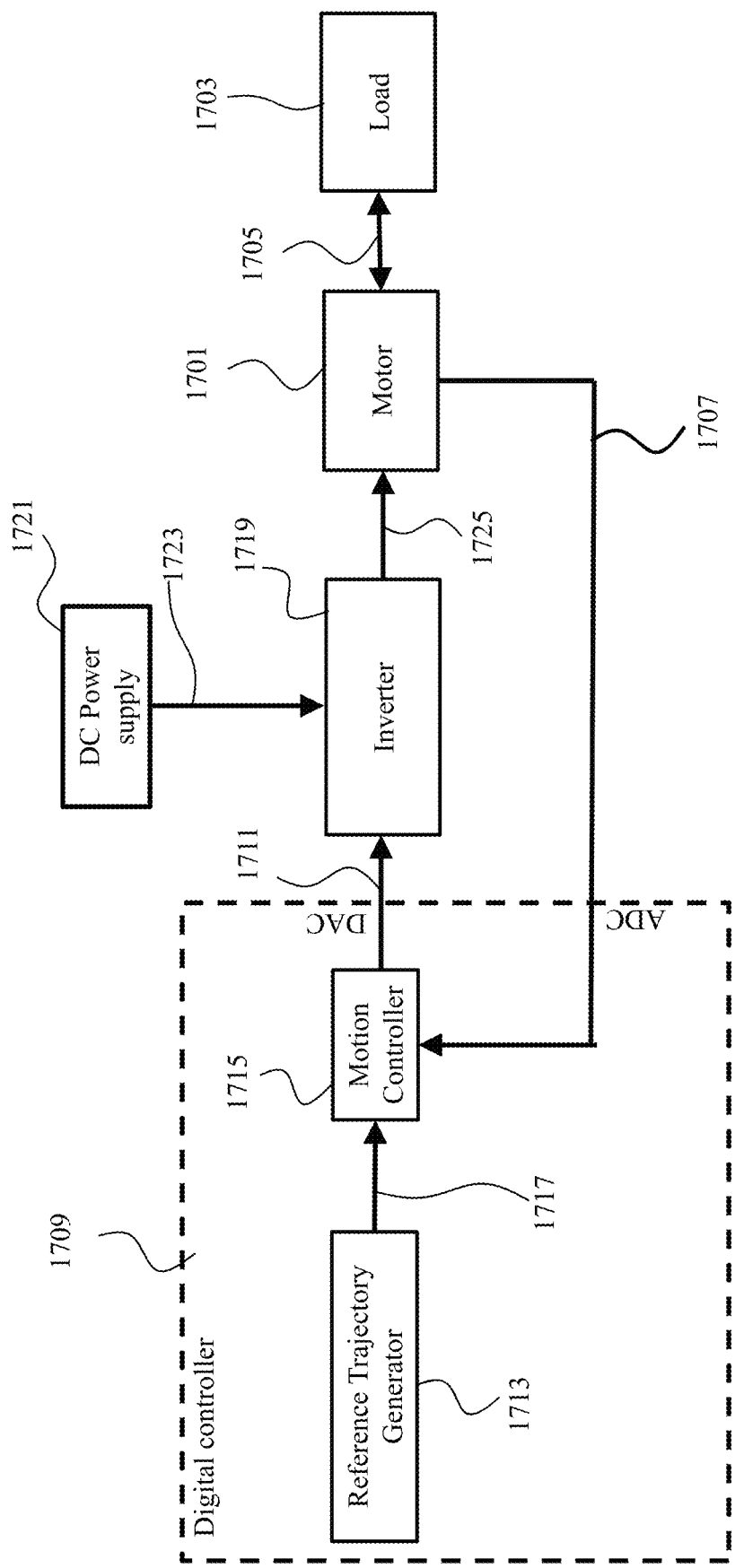
FIG. 17 illustrates a block diagram of a control system for a motor comprising the motor assembly, in accordance with an example embodiment.

FIG. 17 illustrates a block diagram of a control system for a motor 1701 comprising the motor assembly 100 (or alternately motor assembly 1600), in accordance with an example embodiment. FIG. 17 is described below in conjunction with FIG. 1. The motor 1701 is a linear direct drive motor comprising the motor assembly 100 to generate a thrust force. The motor 1701 is connected to a load 1703 through a connection 1705. A position of the mover assembly 101 of the motor assembly 100 may be measured by a position sensor, such as encoder and hall-effect sensor, and the measured position signal is fed back 1707 into an analog/digital converter of a digital controller 1709. Additionally, torque of the motor 1701 is also measured. The digital controller 1709 is configured to generate control signals 1711 specifying values of one or combination of a multi-phase voltage and a current of the motor 1701. In particular, the digital controller 1709 includes a reference trajectory generator 1713 and a motion controller 1715. The reference trajectory generator 1713 generates a reference trajectory 1717 of torques of the motor. Both the motor's measured position 1707 and the reference trajectory 1717 are fed into a motion controller 1715, which generates the control signals 1711 in a form of digital pulse width modulation (PWM) signals. The PWM signal 1711 controls gates in an inverter 1719. A DC power supply 1721 generates a high-voltage DC power 1723 for the inverter 1719. The inverter 1719 is configured to supply multi-phase voltage and current 1725 according to the control signals to the multi-phase windings of the motor to reduce an error between the reference trajectory 1713 and the measured torque of the motor 1701. With such control system, the motor's position can be controlled to follow the reference trajectory.

Figure 18:
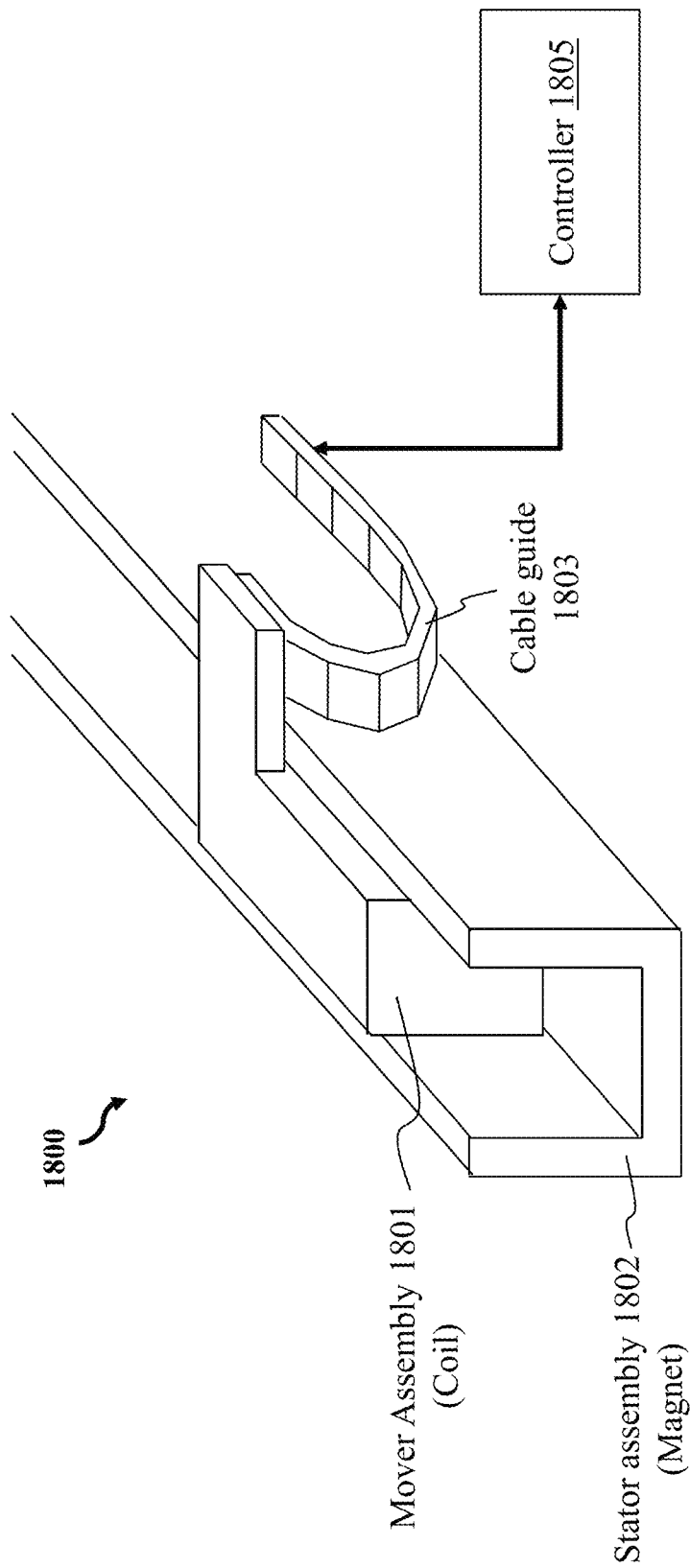
FIG. 18 illustrates a block diagram of a control system comprising the linear motor in accordance with an example embodiment.

FIG. 18 illustrates a block diagram of a control system 1800 comprising the linear motor in accordance with an example embodiment. The control system 1800 comprises a mover assembly 1801 which has coils, in accordance with an example embodiment, and a stator assembly 1802 which has magnets, in accordance with an embodiment. The length of a stator assembly 1802 along the moving direction of the motor is larger than the length of a mover assembly 1802. Controller 1805 generates the control signal for the movement of mover assembly 1901 and send it through power cables which are protected by the cable guide 1803, in order to prevent the cables from being tangled and damaged. One may place or mount objects on mover assembly 1801 to be transported from one location to another.

Figure 19:
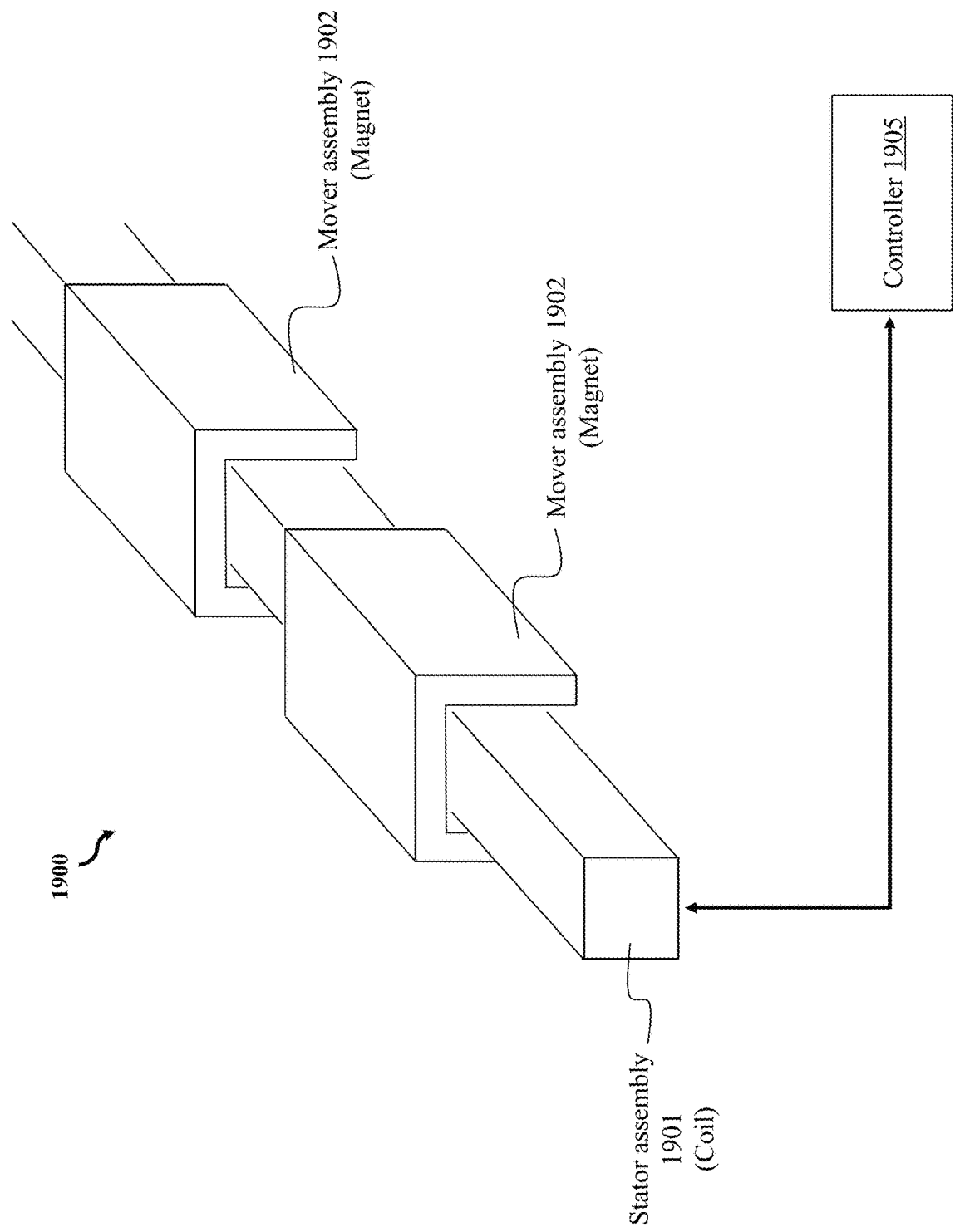
FIG. 19 illustrates a block diagram of an alternative control system comprising the linear motor in accordance with an example embodiment.

FIG. 19 illustrates a block diagram of an alternative control system 1900 comprising the linear motor in accordance with an example embodiment. The control system 1900 comprises a stator assembly 1901 which has coils, in accordance with an example embodiment, and a stator assembly 1902 which has magnets, in accordance with an embodiment. The length of a stator assembly 1901 along the moving direction of the motor is larger than the length of a mover assembly 1902. One may place or mount objects on each mover assembly 1902 to be transported from one location to another. Controller 1905 generates the control signal for the movement of mover assembly 1902 and send it through power cables. In this system the cable guide is not necessary because the stator assembly dose not move and cables can be fixed to the stator assembly. This system may comprise two or more mover assemblies 1902 on the same stator assembly because the length of each mover assembly is smaller than the stator assembly 1901, and there is no cable accompanying with the mover assemblies. Each individual mover assembly 1902 can be moved along the stator assembly 1901 independently by switching the locations of coils to be excited in stator assembly 1901 using the control signals generated by controller 1905.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A motor assembly including a mover assembly configured to slide during an operation of the motor assembly along magnets forming inner walls of a stator, the mover assembly comprising:
   a non-ferromagnetic core with a U-shaped profile of an outer surface having a first and second flat sections arranged parallel to each other, and a third flat section arranged perpendicularly to and intersecting with the first and second flat sections;
   a first and second ferromagnetic laminated structures arranged on the first and second flat sections, wherein each of the first and second laminated structures includes a plurality of ferromagnetic plates extending perpendicularly to corresponding first and second flat sections;
   another non-ferromagnetic core with a rod shape arranged in a gap defined between the first flat section and the second flat section and opposite to the third flat section, and having a first projection and a second projection slidably inserted into a corresponding first groove and a second groove of the non-ferromagnetic core;
   a third ferromagnetic laminated structure disposed on the another non-ferromagnetic core, wherein the third ferromagnetic laminated structure is arranged isolated from the first and second ferromagnetic structures, wherein the third ferromagnetic laminated structure lies on a plane that intersects parallel planes on which first and second ferromagnetic laminated structures lie; and
   windings of wire wrapped around the three ferromagnetic laminated structures and the non-ferromagnetic core.

2. The motor assembly of claim 1, wherein the mover assembly is formed by connecting a plurality of mover assembly units.

3. The motor assembly of claim 2, wherein the plurality of the mover assembly units is stacked together to form the mover assembly using guide teeth and grooves on the ferromagnetic laminated structures of each mover assembly unit of the plurality of the mover assembly units.

4. The motor assembly of claim 1, wherein each of the first flat section and second flat section, comprises a groove to accommodate a ferromagnetic laminated structure, and
   wherein the ferromagnetic laminated structure slides into the groove on each flat section of the first and second flat sections.

5. The motor assembly of claim 1, wherein the stator comprises at least two inner walls, each wall comprising an array of magnets, and
   wherein the mover assembly is arranged in the stator such that the first and second ferromagnetic laminated structures and the winding around the first and second ferromagnetic laminated structures are magnetically in contact with the at least two inner walls of the stator.

6. The motor assembly of claim 1, wherein a magnet in the array of magnet in the stator comprises at least one of: a Halbach permanent magnet or Vernier permanent magnet.

7. The motor assembly of claim 1, wherein a shape of the mover assembly corresponds to a polyhedron.

8. A system including a motor comprising the motor assembly of claim 1, further comprising:
   a digital controller configured to generate control signals specifying values of one or combination of multi-phase voltages and multi-phase currents of the motor for tracking a reference trajectory of torques of the motor; and
   an inverter configured to supply the multi-phase voltages and currents generated according to the control signals to multi-phase windings of the motor to reduce an error between the reference trajectory and measured torque of the motor.

9. The system of claim 8, further comprising a load positioned by the motor.

10. A control system including a motor comprising the motor assembly of claim 1, the control system comprising:
    a conveyor belt operated by the motor, the conveyor belt configured to transport one or more objects from one location to another location; and
    a controller configured to control the motor to adjust speed of the conveyor belt.

11. A motor assembly including a mover assembly configured to slide during an operation of the motor assembly along outer walls of the stator, wherein the mover assembly comprises magnets on inner walls of the mover assembly, and wherein the stator comprising:
    a non-ferromagnetic core with a U-shaped profile of an outer surface having a first and second flat sections arranged parallel to each other, and a third flat section arranged perpendicularly to and intersecting with the first and second flat sections;
    a first and second ferromagnetic laminated structures arranged on the first and second flat sections, wherein each of the first and second laminated structures includes a plurality of ferromagnetic plates extending perpendicularly to corresponding first and second flat sections;

another non-ferromagnetic core with a rod shape arranged in a gap defined between the first flat section and the second flat section and opposite to the third flat section, and having a first projection and a second projection slidably inserted into a corresponding first groove and a second groove of the non-ferromagnetic core;

a third ferromagnetic laminated structure disposed on the another non-ferromagnetic core, wherein the third ferromagnetic laminated structure is arranged isolated from the first and second ferromagnetic structures, wherein the third ferromagnetic laminated structure lies on a plane that intersects parallel planes on which first and second ferromagnetic laminated structures lie; and windings of wire wrapped around the three ferromagnetic laminated structures and the non-ferromagnetic core.

* * * * *